(12) United States Patent
Van Kann

(10) Patent No.: US 7,714,584 B2
(45) Date of Patent: May 11, 2010

(54) GRAVITY GRADIOMETER

(75) Inventor: Frank Joachim Van Kann, Nedlands (AU)

(73) Assignee: Technological Resources Pty. Ltd., Melbourne, Victoria (AU)

( * ) Notice: Subject to any disclaimer, the term of this patent is extended or adjusted under 35 U.S.C. 154(b) by 0 days.

(21) Appl. No.: 11/851,839

(22) Filed: Sep. 7, 2007

(65) Prior Publication Data

US 2008/0116905 A1 May 22, 2008

(30) Foreign Application Priority Data

Nov. 20, 2006 (AU) .............................. 2006906474
Mar. 15, 2007 (AU) .............................. 2007901377

(51) Int. Cl.
G01V 3/16 (2006.01)
G01V 7/00 (2006.01)
G01R 31/02 (2006.01)
G01R 27/00 (2006.01)

(52) U.S. Cl. ...................... 324/330; 324/600; 324/537; 73/382 G; 73/382 R

(58) Field of Classification Search ................. 324/330, 324/76.11, 600, 537; 73/382 G, 382 R
See application file for complete search history.

(56) References Cited

U.S. PATENT DOCUMENTS

| 2,743,415 | A |   | 4/1956 | Williams et al. |
|---|---|---|---|---|
| 2,809,524 | A |   | 10/1957 | Materson |
| 3,273,397 | A |   | 9/1966 | Forward |
| 3,564,921 | A |   | 2/1971 | Bell |
| 3,758,854 | A |   | 9/1973 | Zimmerman |
| 3,769,840 | A | * | 11/1973 | Hansen ...................... 73/382 R |
| 3,805,398 | A |   | 4/1974 | Russell et al. |
| 3,926,054 | A |   | 12/1975 | Buck |

(Continued)

FOREIGN PATENT DOCUMENTS

CN    1278067    12/2000

(Continued)

OTHER PUBLICATIONS

Soundararajan et al., "Nonideal Negative Resistors and Capacitors Using an Operational Amplifier", IEEE Transactions on Circuits and Systems, vol. 22, No. 9, 1975; pp. 760-763.
Paik, H., Superconducting tunable-diaphragm transducer for sensitive acceleration measurements, Journal of Applied Physics, vol. 47, No. 3, Mar. 1976, pp. 1168-1178.

(Continued)

*Primary Examiner*—Amy He
(74) *Attorney, Agent, or Firm*—Fish & Richardson P.C.

(57) ABSTRACT

The present invention provides a gravity gradiometer for measuring components of the gravity gradient tensor. The gravity gradiometer includes at least one sensor mass for movement in response to a gravity gradient and a sensor and actuator unit for generating an electrical signal in response to the movement of the at least one sensor mass and for influencing the movement of the at least one sensor mass. The gravity gradiometer also includes an electronic circuit for simulating an impedance. The electrical circuit is arranged for amplifying the electrical signal received from the sensor and actuator unit and for directing an actuating signal to the sensor and actuator unit. The electronic circuit includes a differential amplifiers having first and second amplifier input terminals and an amplifier output terminal and impedances Z1, Z2, Z3, at least one of the impedances have an imaginary impedance component.

23 Claims, 20 Drawing Sheets

U.S. PATENT DOCUMENTS

| | | | |
|---|---|---|---|
| 3,956,690 A | 5/1976 | Rorden |
| 4,024,468 A | 5/1977 | Hirschi |
| 4,398,167 A | 8/1983 | Dickie et al. |
| 4,713,890 A | 12/1987 | Wells et al. |
| 4,809,545 A | 3/1989 | Lyle |
| 4,828,376 A | 5/1989 | Padera |
| 4,841,772 A | 6/1989 | Paik |
| 5,130,654 A | 7/1992 | Mermelstein |
| 5,224,380 A | 7/1993 | Paik |
| 5,293,119 A | 3/1994 | Podney |
| 5,326,986 A | 7/1994 | Miller, Jr. et al. |
| 5,488,295 A | 1/1996 | Seppa |
| 5,505,555 A | 4/1996 | Van Kann et al. |
| 5,587,526 A | 12/1996 | Lymley et al. |
| 5,589,772 A | 12/1996 | Kugai |
| 5,668,315 A | 9/1997 | Van Kann et al. |
| 5,728,935 A | 3/1998 | Czompo |
| 5,804,722 A | 9/1998 | Van Kann et al. |
| 5,817,939 A | 10/1998 | Lumley et al. |
| 5,922,951 A | 7/1999 | O'Keefe et al. |
| 5,962,781 A | 10/1999 | Veryaskin |
| 6,082,194 A | 7/2000 | Gladwin |
| 6,450,028 B1 | 9/2002 | Vail, III |
| 6,494,091 B2 | 12/2002 | Couture |
| 6,526,825 B2 | 3/2003 | Manson |
| 6,612,171 B1 | 9/2003 | Stephenson et al. |
| 6,658,935 B1 | 12/2003 | Feinberg |
| 6,668,646 B1 | 12/2003 | Davies et al. |
| 6,724,188 B2 | 4/2004 | Butters et al. |
| 6,837,106 B2 | 1/2005 | Etkin et al. |
| 6,882,937 B2 | 4/2005 | McElhinney |
| 6,885,192 B2 | 4/2005 | Clarke et al. |
| 6,954,698 B2 | 10/2005 | Tryggvason |
| 7,053,610 B2 | 5/2006 | Clarke et al. |
| 7,081,747 B2 | 7/2006 | Butters et al. |
| 7,305,879 B2 | 12/2007 | Moody et al. |
| 7,360,419 B2 | 4/2008 | French et al. |
| 7,365,544 B2 * | 4/2008 | McCracken et al. ......... 324/330 |
| 2002/0092350 A1 | 7/2002 | Etkin et al. |
| 2003/0033086 A1 | 2/2003 | Lee et al. |
| 2004/0211255 A1 | 10/2004 | Leeuwen et al. |
| 2005/0116717 A1 | 6/2005 | Dransfield et al. |
| 2005/0160815 A1 | 7/2005 | Lee |
| 2005/0236909 A1 | 10/2005 | Baker, Jr. |
| 2006/0117848 A1 | 6/2006 | Raffalt |
| 2006/0156810 A1 | 7/2006 | Brett et al. |
| 2006/0207326 A1 | 9/2006 | Moody et al. |
| 2006/0277993 A1 | 12/2006 | Wang et al. |
| 2007/0241747 A1 | 10/2007 | Morley et al. |
| 2008/0074113 A1 | 3/2008 | Clarke et al. |
| 2008/0115374 A1 | 5/2008 | Van Kann et al. |
| 2008/0115375 A1 | 5/2008 | Van Kann |
| 2008/0115376 A1 | 5/2008 | Van Kann |
| 2008/0115377 A1 | 5/2008 | Van Kann |
| 2008/0115578 A1 | 5/2008 | Van Kann et al. |
| 2008/0120858 A1 | 5/2008 | Van Kann et al. |
| 2008/0121035 A1 | 5/2008 | Van Kann et al. |
| 2008/0121036 A1 | 5/2008 | Van Kann et al. |
| 2008/0122435 A1 | 5/2008 | Van Kann et al. |
| 2008/0163682 A1 | 7/2008 | Van Kann et al. |
| 2008/0173090 A1 | 7/2008 | Van Kann et al. |
| 2008/0257038 A1 | 10/2008 | Van Kann et al. |
| 2008/0282796 A1 | 11/2008 | Van Kann et al. |
| 2008/0302179 A1 | 12/2008 | Van Kann et al. |
| 2008/0302180 A1 | 12/2008 | Van Kann et al. |
| 2008/0307883 A1 | 12/2008 | Van Kann et al. |

FOREIGN PATENT DOCUMENTS

| | | |
|---|---|---|
| DE | 197 51 724 | 7/1999 |
| JP | 2002-40155 | 6/2002 |
| RU | 2 046 380 | 10/1995 |
| RU | 2 056 642 | 3/1996 |
| RU | 2 127 439 | 3/1999 |
| RU | 2 156 481 | 9/2000 |
| RU | 2 167 437 | 5/2001 |
| RU | 2 171 481 | 7/2001 |
| RU | 2 171 482 | 7/2001 |
| RU | 2 171 483 | 7/2001 |
| RU | 2 172 967 | 8/2001 |
| RU | 2 175 773 | 11/2001 |
| RU | 2 221 263 | 1/2004 |
| RU | 2 242 032 | 12/2004 |
| RU | 2 253 138 | 5/2005 |
| RU | 2 253 882 | 6/2005 |
| RU | 2 290 674 | 10/2005 |
| WO | WO 90/07131 | 6/1990 |
| WO | 97/41459 | 11/1997 |
| WO | 00/31550 | 6/2000 |
| WO | 02/44757 | 6/2002 |
| WO | WO 20007/038819 | 4/2007 |
| WO | WO 2008/061282 | 5/2008 |

OTHER PUBLICATIONS

Forward, R., "Electronic cooling of resonant gravity gradiometers", Journal of Applied Physics, vol. 50, No. 1, Jan. 1979, pp. 1-6.

Paik, H., J., "Superconducting tensor gravity gradiometer", Second International Symposium on Inertial Technology of Surveying and Geodesy, Banff, Canada, Jun. 1981.

Moody, M., et al., Superconducting gravity gradiometer for space and terrestrial applications:, Journal of Applied Physics, vol. 60, No. 12, Dec. 15, 1986, pp. 4308-4315.

Chan, H., et al, "Superconducting gravity gradiometer for sensitive gravity measurements", Physical Review D., vol. 35, No. 12, Jun. 15, 1987, pp. 3551-3571.

Moody, M., et al., "Gauss's Law Test of Gravity at Short Range", Physical Review Letters, vol. 70, No. 9, Mar. 1, 1993, pp. 1195-1198.

Paik, H., et al., 6 page reprint of "Airborne/shipborne SGG Survey System", Proceedings of the International Symposium on Kinematic Systems in Geodesy, Geomatics and Navigation, Banff, Canada, Jun. 1997, pp. 565-570.

Moody, M., et al., "Three-axis superconducting gravity gradiometer for sensitive gravity measurements", Review of Scientific Instruments, vol. 73, No. 11, Nov. 2002, pp. 3957-3974.

Moody, M., et al,., "Principle and performance of a superconducting angular accelerometer", Review of Scientific Instruments, vol. 74, No. 3, Mar. 2003, pp. 1310-1318.

Nadal-Guardia et al., "Constant Charge Operation of Capacitor Sensors Based on Switched Current Circuits", IEEE Sensors Journal, vol. 3, No. 6, Dec. 6, 2003, pp. 835-842.

Moody et al., "A Superconducting Gravity Gradiometer for Inertial Navigation", Position Location and Navigation Symposium, 2004, PLANS 2004, Apr. 26-29, 2004, pp. 775-781.

International Search Report issued in connection with PCT/AU2007/001143 dated Sep. 11, 2007.

Robert Matthews, "The University of Western Australia Gravity Gradiometer Group, Mobile Gravity Gradiometry," *Department of Physics—University of Western Australia*, 2002, 454 pages.

Mark Helm Dransfield, "Airborne Gravity Gradiometry," *The University of Western Australia Department of Physics*, 1994, 254 pages.

Robert David Penny, Development of Two Prototype Cryogenic Gravity Gradiometers for Geophysical Exploration, *Department of Physics—University of Western Australia*, 1992, 258 pages.

F. J. van Kann, *End-of-Grant Report: Project* No. 880, "An Airborne Cryogenic Gravity Gradiometer for Geophysical Exploration," The University of Western Australia Department of Physics, May 1992, 68 pages.

PCT Written Opinion of the International Searching Authority dated Sep. 11, 2007 for PCT/AU2007/001143, 4 pages.

* cited by examiner

GRAVITY GRADIOMETER

FIELD OF THE INVENTION

The present invention relates to a gravity gradiometer and to components for high precision measurement instruments.

BACKGROUND OF THE INVENTION

Gravimeters are used in geological exploration to measure the first derivatives of the earth's gravitational field. Whilst some advances have been made in developing gravimeters which can measure the first derivatives of the earth's gravitational field because of the difficulty in distinguishing spatial variations of the field from temporal fluctuations of accelerations of a moving vehicle, these measurements can usually be made to sufficient precision for useful exploration only with land-based stationary instruments.

Gravity gradiometers (as distinct from gravimeters) are used to measure the second derivative of the gravitational field and use a sensor which is required to measure the differences between gravitational forces down to one part in $10^{12}$ of normal gravity.

Typically such devices have been used to attempt to locate deposits such as ore deposits including iron ore and geological structures bearing hydrocarbons.

The gravity gradiometer typically has at least one sensor in the form of sensor mass which is pivotally mounted for movement in response to the gravity gradient.

A known gravity gradiometer is typically mounted in an aircraft and carried by the aircraft while making measurements. The consequence of this is that the gravity gradiometer can move with movements of the aeroplane. This creates accelerations of the gradiometer which are detected by the gravity gradiometer and if not compensated for, will produce noise or swamp actual accelerations or movement of the gradiometer in response to the gravity gradient which is to be detected by the gravity gradiometer.

A known gravity gradiometer includes two sensor masses which are orthogonally positioned and arranged to move about a common axis. The sensor masses are suspended by pivots and can oscillate in planes that are orthogonal to the common axis. For measurement of the gravity gradient the instrument is continuously rotated and a local change in the gravity gradient results in oscillating of both sensor masses relative to a rotated housing of the instrument. Such arrangement has the advantage that at least some unwanted accelerations, such as those resulting from a sudden movement of a aircraft, are experienced by both sensor masses in the same manner and can be eliminated.

The forces that result in such oscillation are very small and for proper operation of the gravity gradiometer each sensor mass should be balanced so that each sensor mass has the same dynamic properties, which provides a technological challenge.

The gravity gradiometer typically is moved relatively fast in an aircraft over a ground plane. As described above, the instrument with sensor masses is continuously rotated and a change in gravitational gradient causes the oscillating movement of the sensor masses relative to a housing. Typically the angular frequency of the rotation is chosen so that the sensor masses oscillate at or near resonance frequency, which increases sensitivity. Both sensor masses should have the same resonance frequency and the same mass.

Further, the bandwidth associated with the resonant oscillation of the sensor masses should be relatively large as the bandwidth determines the spatial resolution with which changes in the gravitational gradient can be detected when the apparatus is flown over a ground plane.

The present invention provided technological advancement.

SUMMARY OF THE INVENTION

The present invention provides in a first aspect a gravity gradiometer for measuring components of the gravity gradient tensor, the gravity gradiometer comprising:
  at least one sensor mass for movement in response to a gravity gradient;
  a pivotal coupling enabling the movement of the at least one sensor mass about an axis;
  a sensor and actuator unit for generating an electrical signal in response to the movement of the at least one sensor mass and for influencing the movement of the at least one sensor mass; and
  an electronic circuit for simulating an impedance, the electrical circuit being arranged for amplifying the electrical signal received from the sensor and actuator unit and for directing an actuating signal to the sensor and actuator unit, the electronic circuit comprising:
    a differential amplifier having first and second amplifier input terminals and an amplifier output terminal;
    a reference terminal; and
    impedances $Z_1$, $Z_2$, $Z_3$, at least one of the impedances having an imaginary impedance component;
      wherein the first and second amplifier input terminals and the second amplifier input terminal are coupled via the impedances Z1 and Z2 respectively and the amplifier output terminal is coupled to the reference terminal via the impedance Z3 whereby between the first amplifier input terminal and the amplifier output terminal in use the impedance of approximately is simulated.

In one specific embodiment the differential amplifier is a low thermal noise amplifier, such as a low noise j-FET amplifier. The differential amplifier may have a noise matched resistance $$R_{opt} = \sqrt{\frac{S_V}{S_i}}$$

($S_v$: spectral density of amplifier's voltage noise; $S_i$: spectral density of amplifier's current noise) of more than 1 MΩ or even more than a few 1 MΩ.

Further, the differential amplifier may have a noise temperature $$T_{opt} = \frac{\sqrt{S_V S_i}}{2k_B}$$

($k_B$: Bolzman constant) of less than 5K, or even less than 1K.

The electronic circuit generates a voltage in response to an applied electrical input current and a feedback loop is established, which enables the simulation of the impedance in a manner such that low thermal noise is generated.

The reference terminal may be a common ground terminal.

The generated simulated impedance may have a real and an imaginary component. For example, each impedance $Z_1$, $Z_2$ and $Z_3$ may comprise a resistor that is parallel coupled to at least one capacitor.

The sensor and actuator unit may comprise a plurality of separate sensors and actuators. The sensor and actuator unit may also comprise a plurality of transducers which each function as sensors and actuators.

In one specific embodiment of the present invention the sensor and actuator unit is arranged for generating an ac electrical signal in response to an oscillation of the at least one sensor mass. In this embodiment the electronic circuit is arranged so that the imaginary component of the simulated impedance influences the resonance frequency of the at least one sensor mass via the actuator of the sensor and actuator unit. Consequently, selection of components of the electronic circuit, or tuning of the components, allows fine tuning of the resonance behaviour of the at least one sensor mass.

The electrical circuit may also be arranged for simulating the impedance $Z_L$ having a real and therefore ohmic component. In this case the electronic circuit typically is arranged so that the real component of the simulated impedance damps a resonant oscillation of the at least one sensor mass via the actuator of the sensor and actuator unit. Such damping may for example be required for reducing a Q-factor associated with the resonant oscillation of the at least one sensor mass. If the above-defined electrical circuit simulates the impedance in a manner such that no or very little thermal noise is generated, the damping will also introduce no or very little thermal noise.

The pivotal coupling may comprise a flexure web for connecting the at least one sensor mass in a housing for movement in response to the gravity gradient.

The flexure web may be integral with the mass and housing to form a monolithic structure. However, the flexure web may also be formed on a separate flexure web element and connected to the housing and the at least one sensor mass.

The at least one sensor mass may be provided in any shape, but typically is a chevron shaped bar.

The gravity gradiometer may comprise a pair of transversally arranged sensor masses with respective sensor and actuator units for measuring components of the gravity gradient tensor.

The present invention provides in a second aspect an electronic circuit for simulating an impedance, the electronic circuit comprising:
  a differential amplifier having first and second amplifier input terminals and an amplifier output terminal;
  a reference terminal; and
  impedances $Z_1$, $Z_2$, $Z_3$, at least one of the impedances having an imaginary impedance component;
  wherein the first and second amplifier input terminals and the amplifier output terminal are coupled via the impedances Z1 and Z2 respectively and the second amplifier input terminal is coupled to the reference terminal via the impedance Z3 whereby between the first amplifier input terminal and the amplifier output terminal in use the impedance of approximetley is simulated.

In one specific embodiment the differential amplifier is a low thermal noise amplifier, such as a low noise j-FET amplifier. The differential amplifier may have a noise matched resistance $$R_{opt} = \sqrt{\frac{S_V}{S_i}}$$

($S_v$: spectral density of amplifier's voltage noise; $S_i$: spectral density of amplifier's current noise) of more than 1 MΩ or even more than a few 1 MΩ.

Further, the differential amplifier may have a noise temperature $$T_{opt} = \frac{\sqrt{S_V S_i}}{2k_B}$$

($k_B$: Bolzman constant) of less than 5K, or even less than 1K.

The electronic circuit generates a voltage in response to an applied electrical input current and a feedback loop is established, which enables the simulation of the impedance in a manner such that low thermal noise is generated.

The reference terminal may be a common ground terminal.

The generated simulated impedance may have a real and an imaginary component. For example, each impedance $Z_1$, $Z_2$ and $Z_3$ may comprise a resistor that is parallel coupled to at least one capacitor.

The invention will be more fully understood from the following description of specific embodiments of the invention. The description is provided with reference to the accompanying drawings.

DETAILED DESCRIPTION OF THE SPECIFIC EMBODIMENTS

Figure 1:
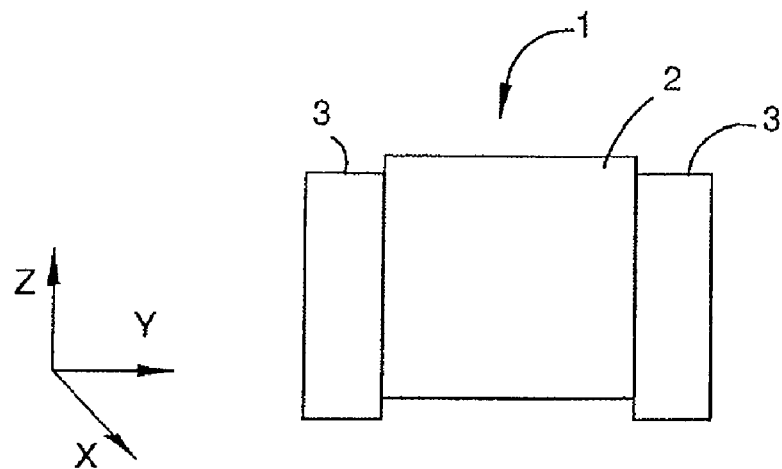
FIG. 1 is a schematic view of a gravity gradiometer according to a specific embodiment of the present invention.

FIG. 1 is a schematic view of a gravity gradiometer 1 according to a specific embodiment of the present invention. The gravity gradiometer 1 is arranged for vertical positioning relative to a ground plane. Throughout this specification the ground plane coincides with an x-y plane of an x,y,z-coordination system and consequently the gravity gradiometer is in this embodiment arranged for orientation along the z-axis so that the $\Gamma_{xy}$ and $(\Gamma_{xx}-\Gamma_{yy})$ components of the gravity gradient tensor can be measured.

The function of the gravity gradiometer 1 may be briefly summarised as follows. The gravity gradiometer has in this embodiment two substantially identical sensor masses which are pivotally mounted on a mounting so that they can oscillate relative to the mounting. The sensor masses with mounting are rotated about the z-axis and with an angular frequency that approximately equals half the resonance frequency of sensor masses. A gravity gradient will result in a force on the sensor masses which will then oscillate relative to the mounting during that rotation. Components of the gravity gradient tensor can be determined from the oscillating movement of the sensor masses. For further details on the general principal of such measurements are described in the applicants co-pending PCT international patent application number PCT/AU2006/001269.

The gravity gradiometer shown in FIG. 1 comprises a housing 2 which is connected to mount 3 for connection to an external platform (not shown). The external platform is arranged for rotation of the housing 2 at a suitable angular frequency about the z-axis. Further, the external platform is arranged for adjusting the housing 2 about three orthogonal axes.

Figure 2:
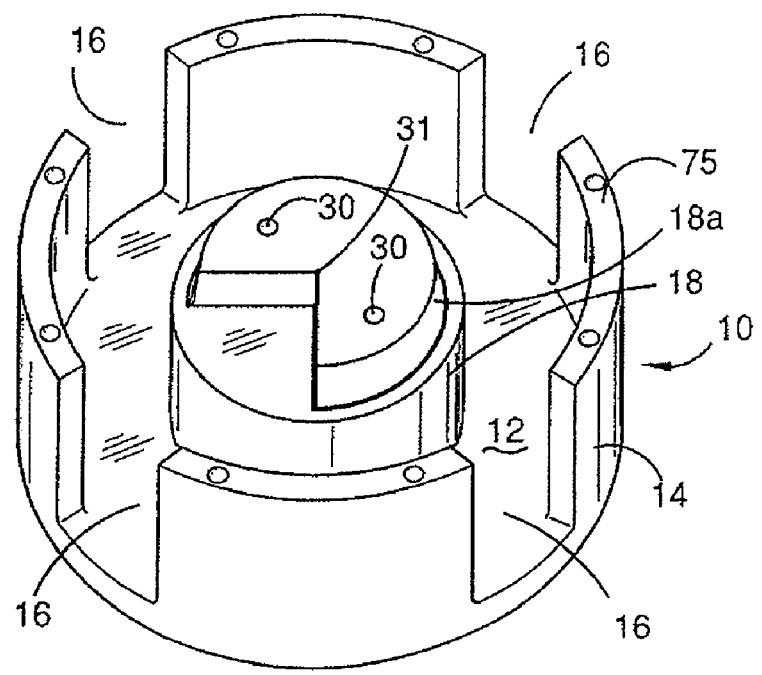
FIG. 2 is a perspective view of a first mount forming part of a mounting of the gravity gradiometer of according to the specific embodiment of the present invention.
Figure 5:
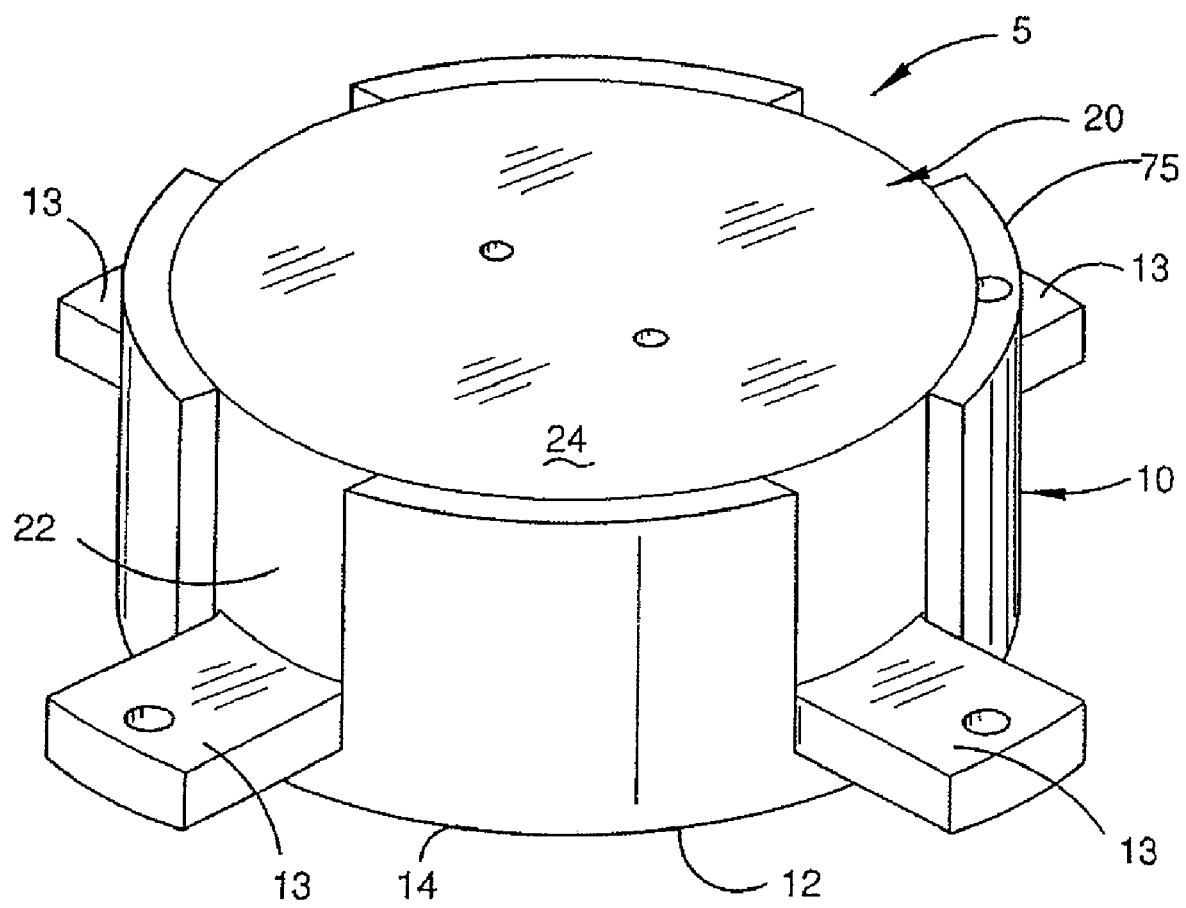
FIG. 5 is a view of the assembled structure.

With reference to FIG. 2 a first mount 10 is now described. The first mount 10 forms a part of rotatable mounting 5 which is shown in FIG. 5. The mount 10 comprises a base 12 and an upstanding peripheral wall 14. The peripheral wall 14 has a plurality of cut-outs 16. The base 12 supports a hub 18.

Figure 3:
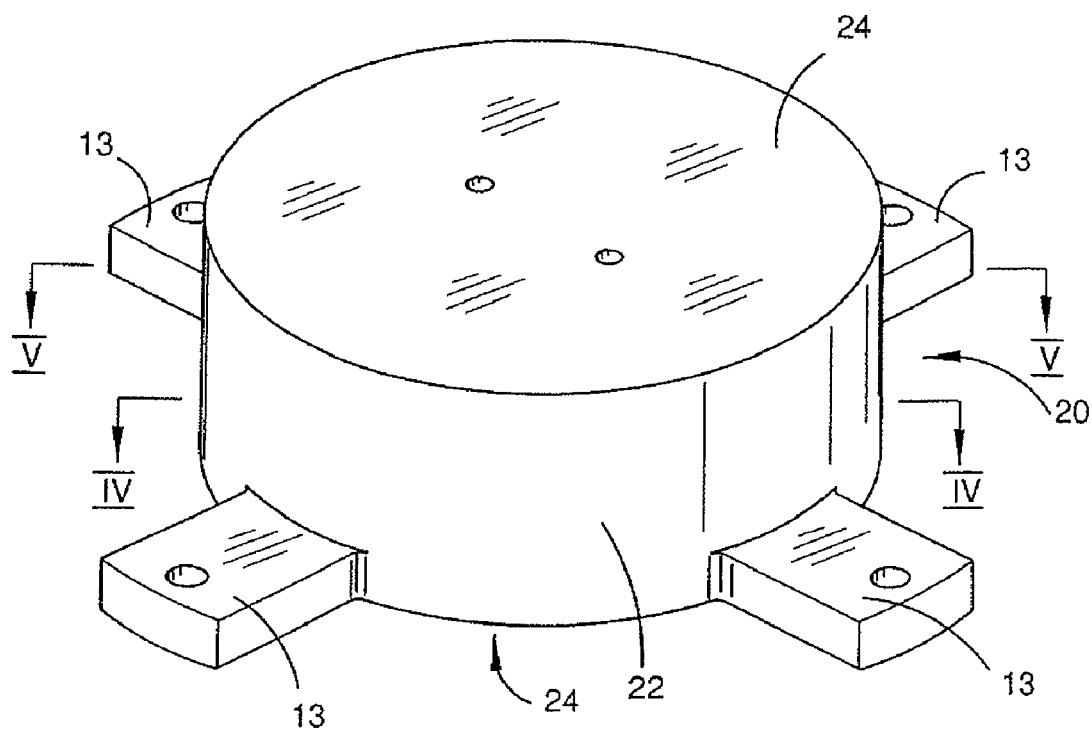
FIG. 3 is a perspective view of a second mount of the mounting according to a specific embodiment of the present invention.
Figure 4:
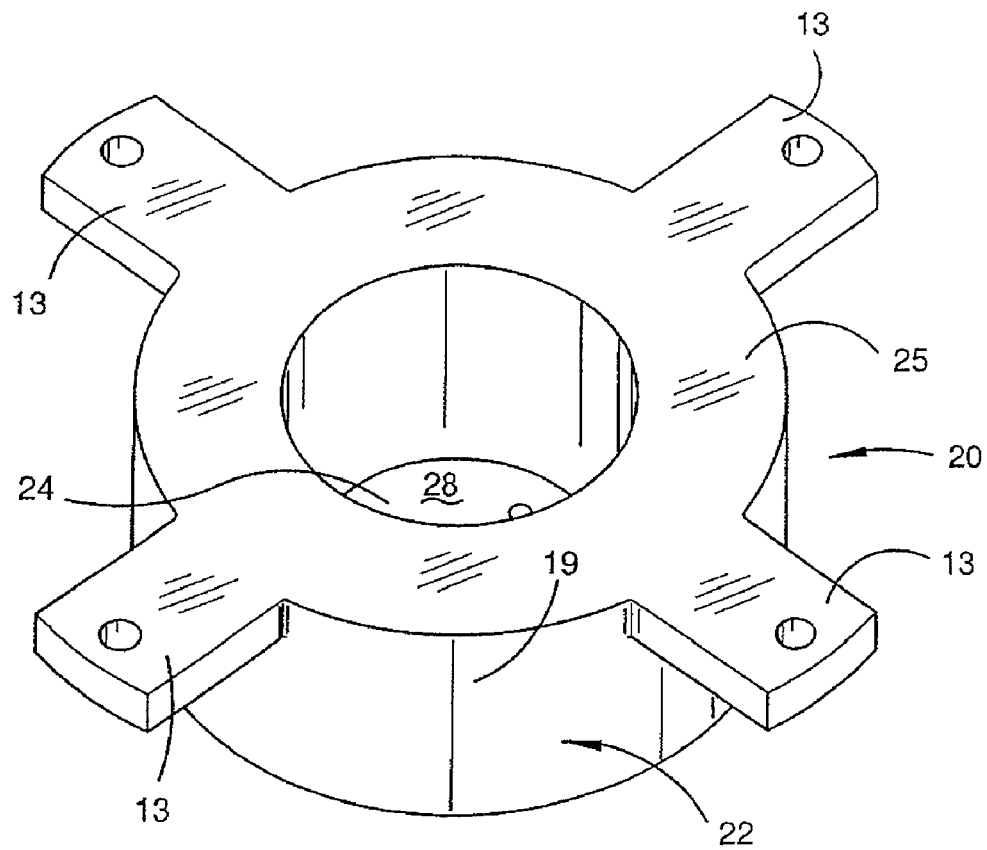
FIG. 4 is a perspective view from underneath the mount shown in FIG. 3.

FIGS. 3 and 4 show a second mount 20 which comprises a peripheral wall 22 and a top wall 24. The peripheral wall 22 has four lugs 13 for supporting the mounting 5 in the housing 2. The top wall 24 and the peripheral wall 22 define an opening 28. The second mount 20 is mounted on the first mount 10 by locating the hub 18 into the opening 28 and the lugs 13 through respective cut-outs 16 as is shown in FIG. 5.

The first mount 10 is joined to the second mount 20. The flexure web 31 is formed in the first mount 10 so that a primary mount portion of the mount 10 can pivot about a flexure web 31 relative to a secondary mount portion of the mount 10. This will be described in more detail with reference to the second embodiment shown in FIGS. 10 to 16.

The mounting 5 mounts the sensor 40 (which will be described in more detail hereinafter and which is typically in the form of a mass quadruple) for fine rotational adjustment about the z-axis for stabilising the gradiometer during the taking of measurements particularly when the gradiometer is airborne. As described above, rotational stabilisation about the x-and y-axis is provided by the external platform.

Figure 6:
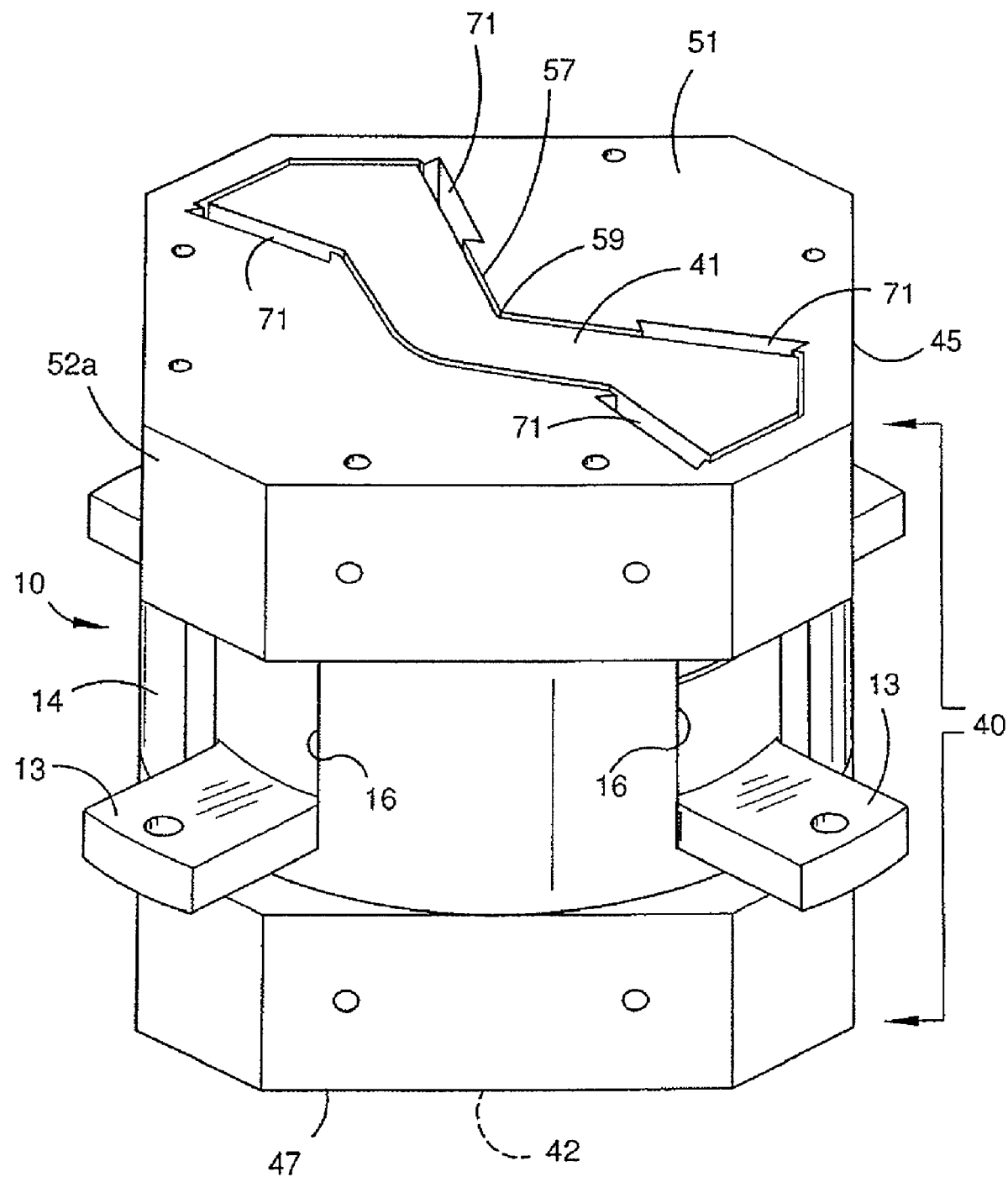
FIG. 6 is a perspective view showing assembled components of the gravity gradiometer according to another specific embodiment of the present invention.

FIG. 6 shows sensor 40 mounted on the mounting. The sensor 40 is an Orthogonal Quadruple Responder—OQR sensor formed of a first mass and a second mass in the form of a first bar 41 and a second bar 42 (not shown in FIG. 6) orthogonal to the bar 41 and which is of the same shape as the bar 41.

The bar 41 is formed in a first housing portion 45 and the bar 42 is formed in a second housing portion 47. The bar 41 and the second housing portion 45 is the same as bar 42 and the second housing portion 47 except that one is rotated 90° with respect to the other so that the bars are orthogonal. Hence only the first housing portion 45 will be described.

Figure 7:
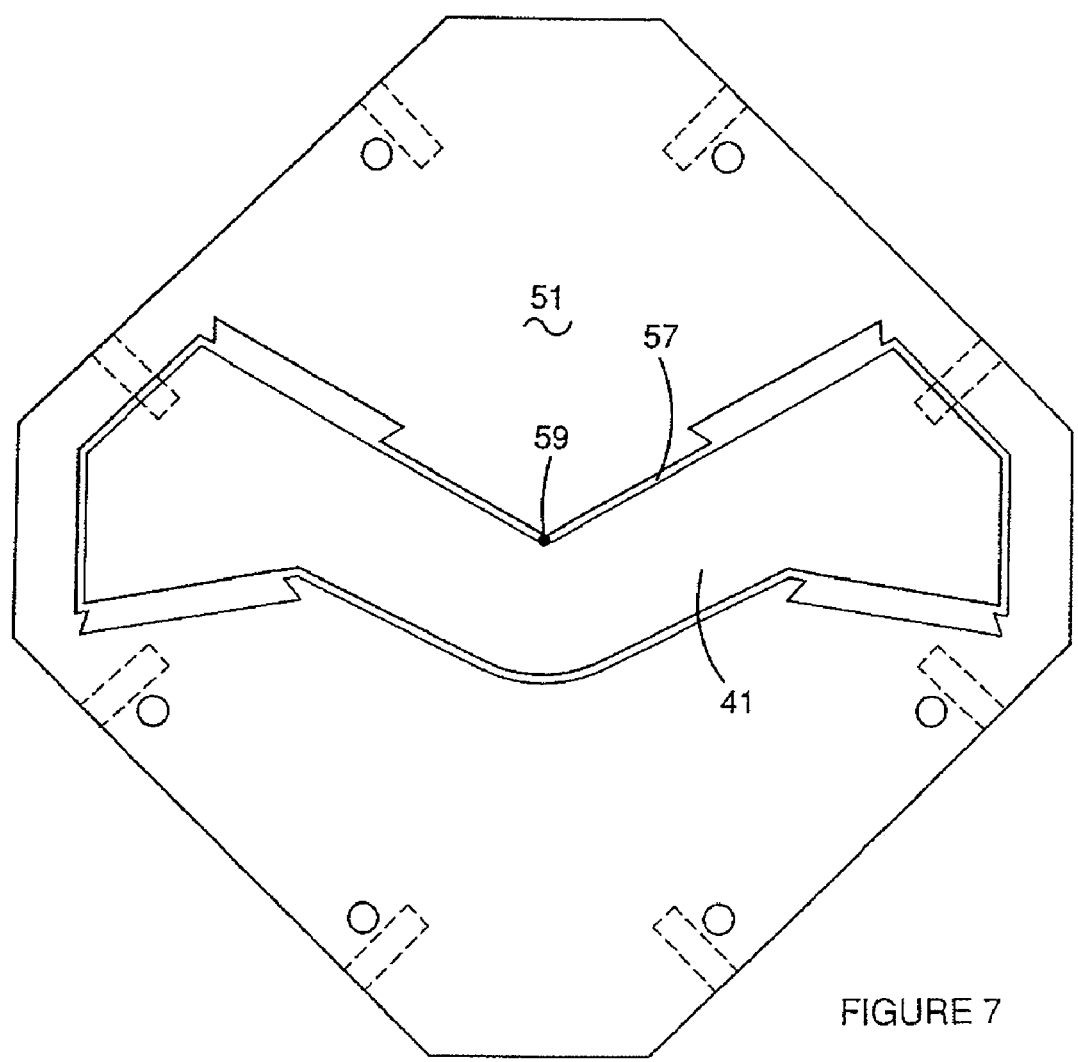
FIG. 7 is a plan view of a bar according to a specific embodiment of the present invention.

The first housing portion 45 has an end wall 51 and a peripheral side wall 52a. The end wall 51 is connected to rim 75 (FIGS. 2 and 5) of the wall 14 of the first mount 10 by screws or the like (not shown). The bar 41 is formed by a cut 57 in the wall 51 except for a second flexure web 59 which joins the bar 41 to the wall 51. The second flexure 59 web is shown enlarged in the top view of the bar 41 in FIG. 7. Thus, the bar 41 is able to pivot relative to the first housing portion 45 in response to changes in the gravitational field. The bar 42 is mounted in the same way as mentioned above and also can pivot relative to the second housing portion 47 in response to changes in the gravitational field about a third flexure web. The second housing portion 47 is connected to base 12 (FIG. 2) of the first mount 10.

The bar 41 and the first housing portion 45 together with the second flexure web 59 are an integral monolithic structure.

Transducers 71 (not shown in FIGS. 2 to 4) are provided for measuring the movement of the bars and for producing output signals indicative of the amount of movement and therefore of the measurement of the differences in the gravitational field sensed by the bars.

Figure 8:
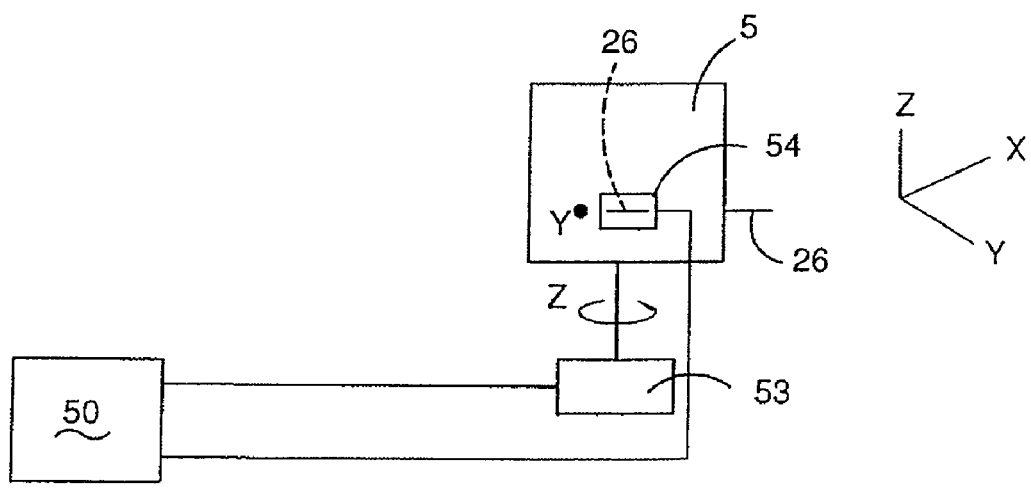
FIG. 8 is a diagram showing actuator control according to a specific embodiment of the present invention.

FIG. 8 is a schematic block diagram showing actuator control to stabilise the gradiometer by rotating the mounting 5 about the z-axis. A controller 50 which may be a computer, microprocessor or the like outputs signals to actuators 53 and 54, which are arranged to rotate the mounting 5 about the z-axis. Each actuator is positioned stationary relative to lugs 13 and coupled to the first mount 10 so that the actuator can effect a rotation by a small angle of the mount 10 with other components relative to the lugs 13 (and other components that are stationary relative to the lugs 13). Each actuator provides a linear movement and is positioned so that the linear movement is translated into a small rotation of the mount 10. The actuators will be described in more detail with reference to FIG. 27. The position of the mounting 5 is monitored so that appropriate feedback can be provided to the controller 50 and the appropriate control signals provided to the actuators to rotate the support 10 about the z-axis as is required to stabilise the support during movement through the air either within or towed behind an aircraft.

The specific embodiment also includes angular accelerometers which are similar in shape to the bars 41 and 42 but the shape is adjusted for zero quadruple moment. The linear accelerometers are simple pendulous devices with a single micro pivot acting as the flexural hinge.

Figure 9:
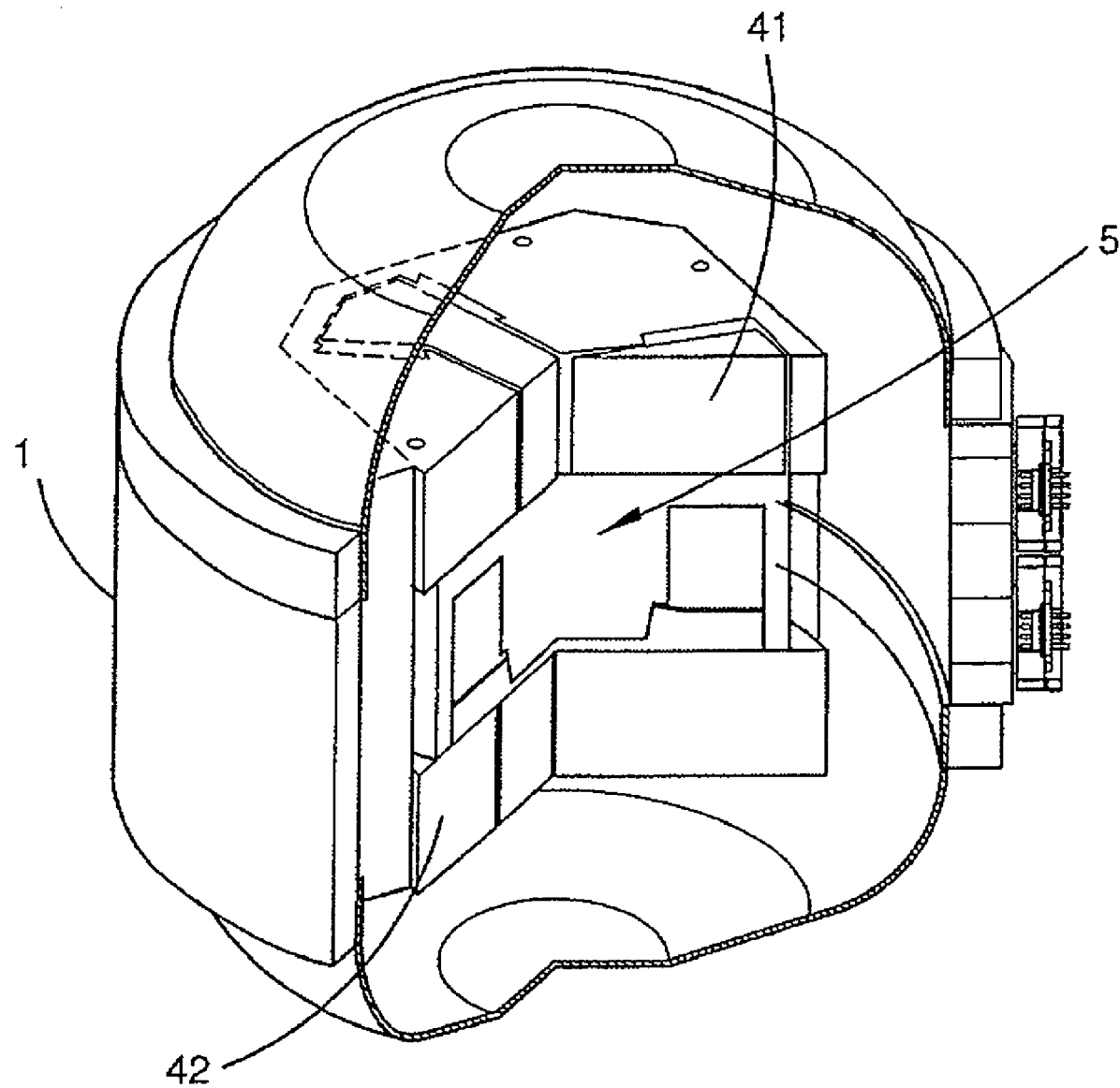
FIG. 9 is a perspective view of components of a gravity gradiometer according to a specific embodiment of the present invention.

FIG. 9 is a cut away view of components of the gravity gradiometer ready for mounting in the housing 1 which in turn is to be mounted in the external platform 2.

The transducers 71 measure the angle of displacement of the bars 41 and 42 and control circuitry (not shown) is configured to measure the difference between them. In this embodiment, the transducers 71 are constant charge capacitors, which will be described in more detail with reference to FIG. 22.

FIGS. 10 to 15 show a second embodiment in which like parts indicate like components to those previously described.

Figure 15:
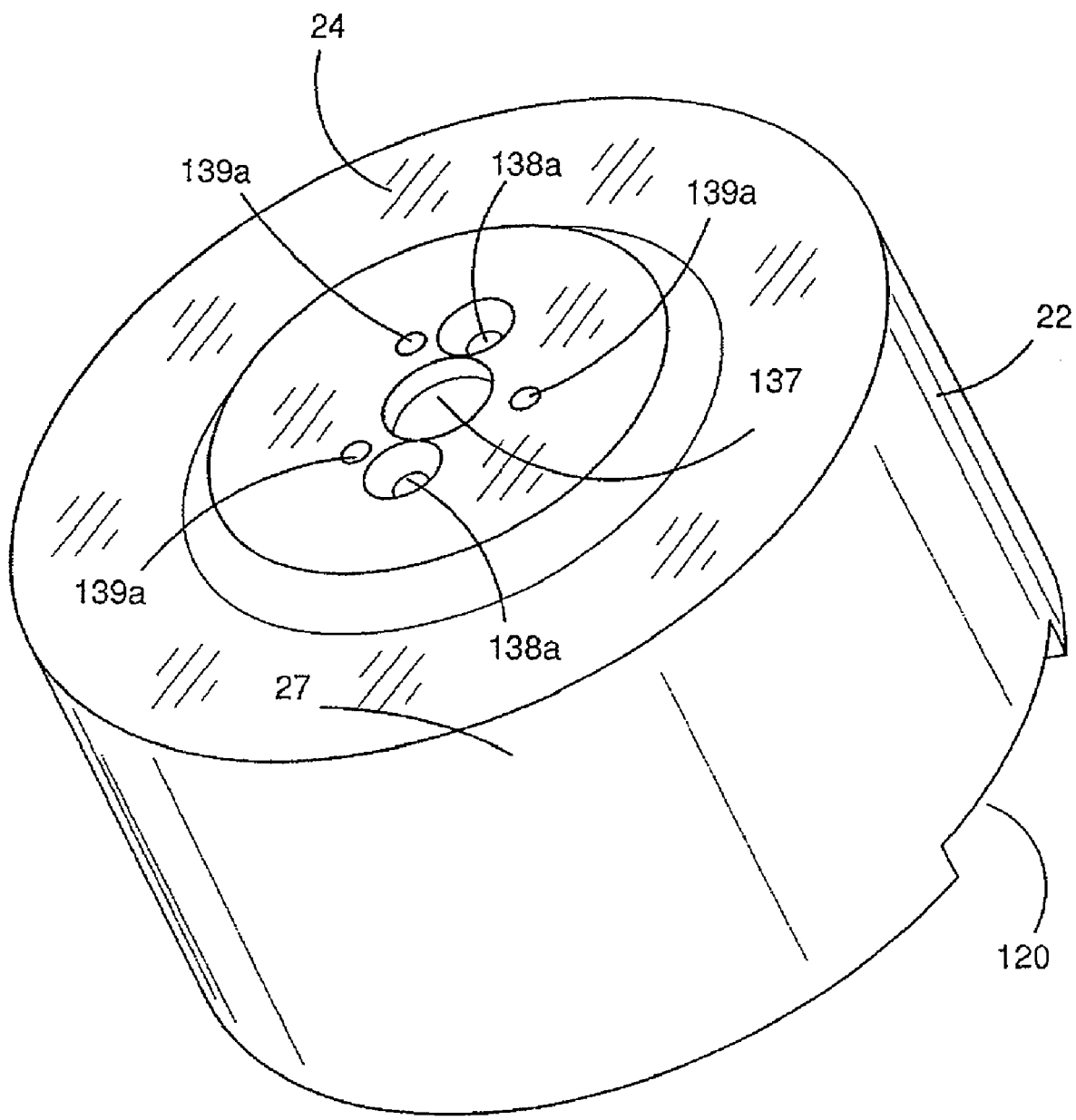
FIG. 15 is a perspective view of the second mount component of FIG. 14 from above.
Figure 16:
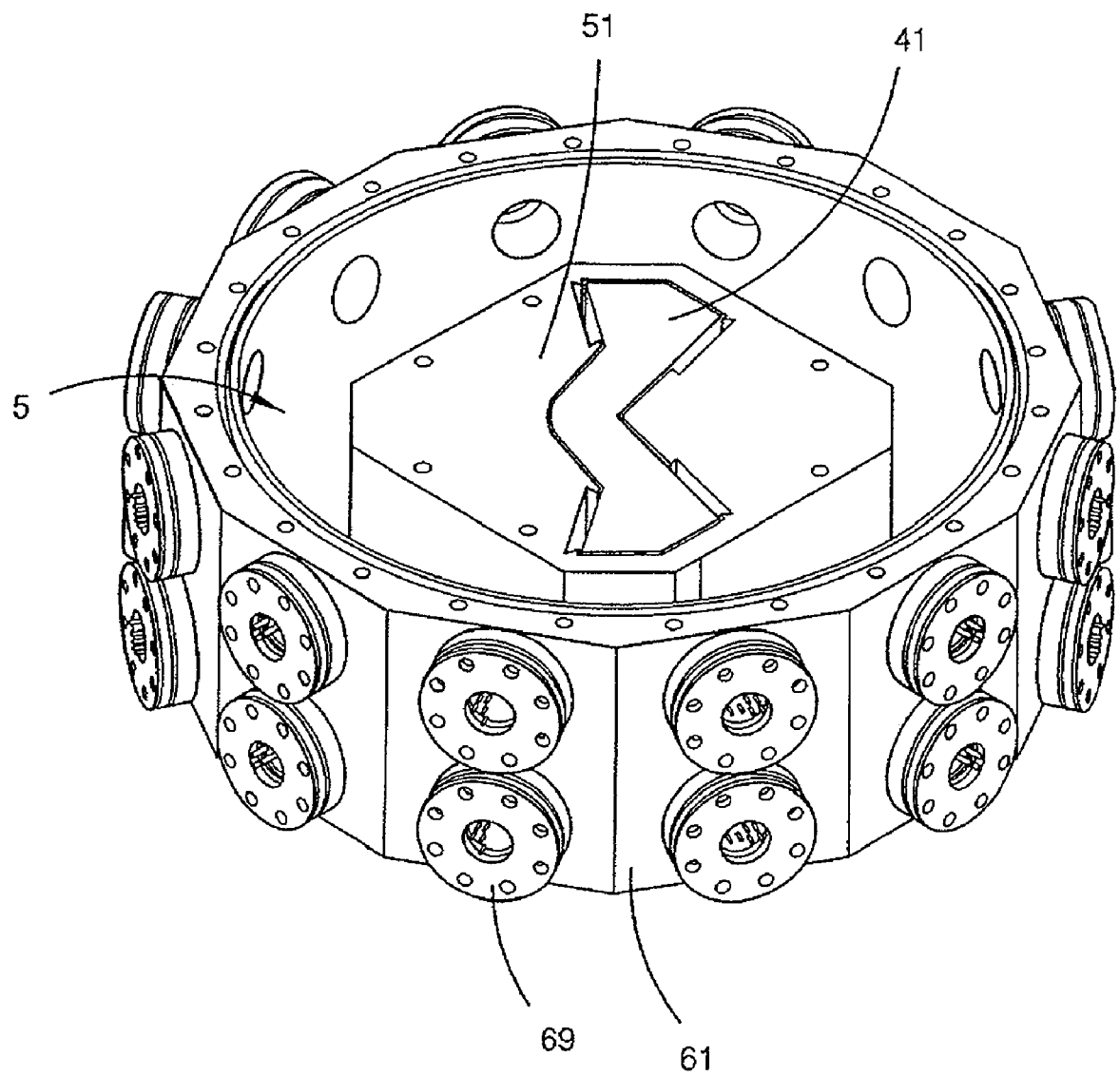
FIG. 16 is a perspective view of assembled components of the gravity gradiometer according to a specific embodiment of the present invention.

In the second embodiment the first mount 10 has cut-outs 80 which effectively form slots for receiving lugs (not shown) which are connected to the mount 10 in the cut-outs 80 and also to the second mount 20 shown in FIGS. 15 and 16. In this embodiment the lugs are separate components so that they can be made smaller, and more easily, made than being cut with the second mount section 20.

Figure 10:
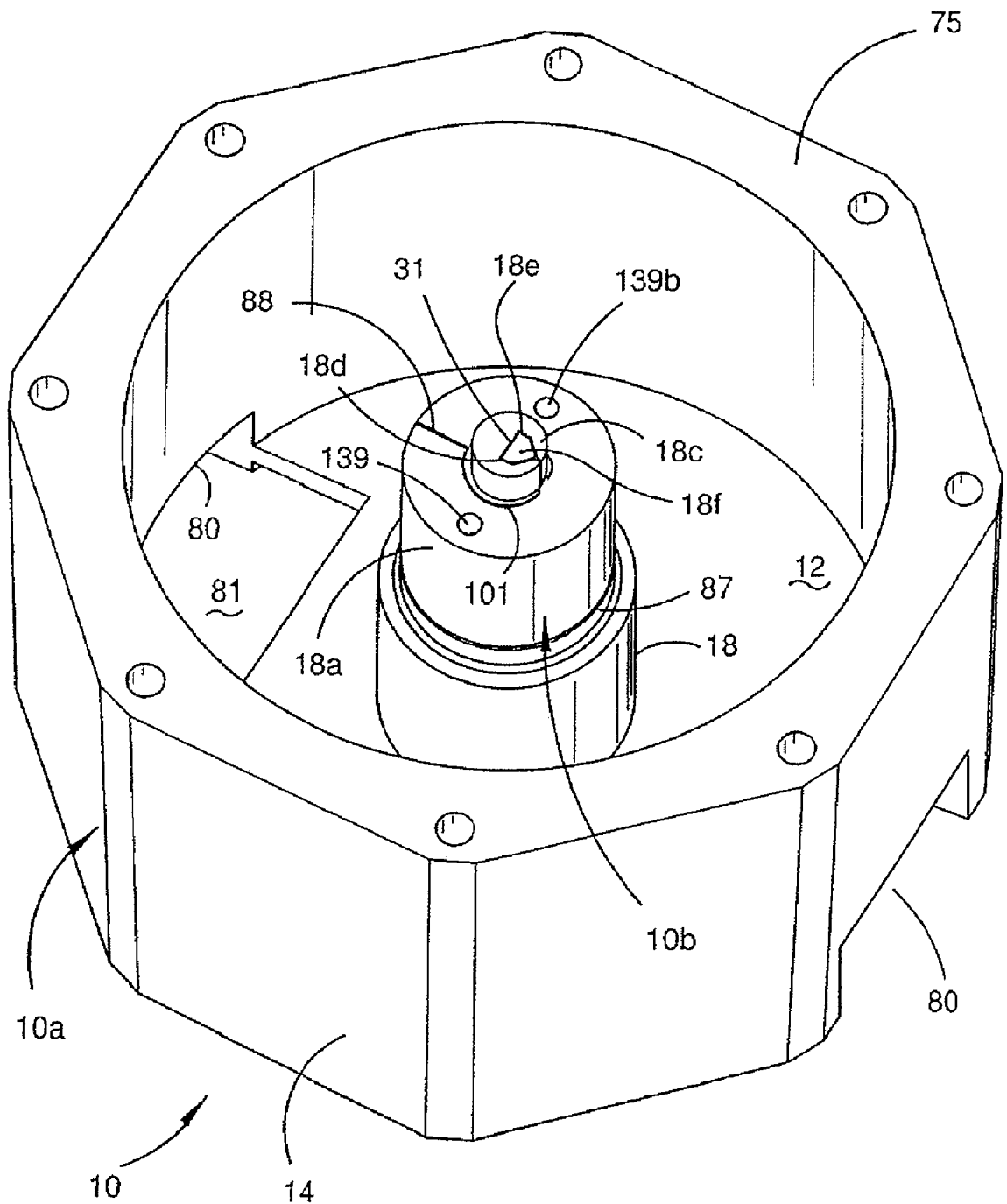
FIG. 10 is a perspective view of a first mount of a mounting according to another specific embodiment of the present invention.

In FIG. 10 a cut 87 is made to define the part 18a of the hub 18. The cut 87 then extends radially inwardly at 88 and then around central section 18c as shown by cut 101. The cut 101 then enters into the central section 18c along cut lines 18d and 18e to define a core 18f. The core 18f is connected to the central section 18c by the flexural web 31 which is an uncut part between the cut lines 18e and 18d. The part 10a therefore forms a primary mount portion of the mount 10 which is separated from a secondary mount portion 10a of the mount 10 except for where the portion 18a joins the portion 10a by the flexural web 31. The part 18a effectively forms an axle to allow for rotation of the part 18a relative to the part 10a in the z direction about the flexure web 31.

Figure 11:
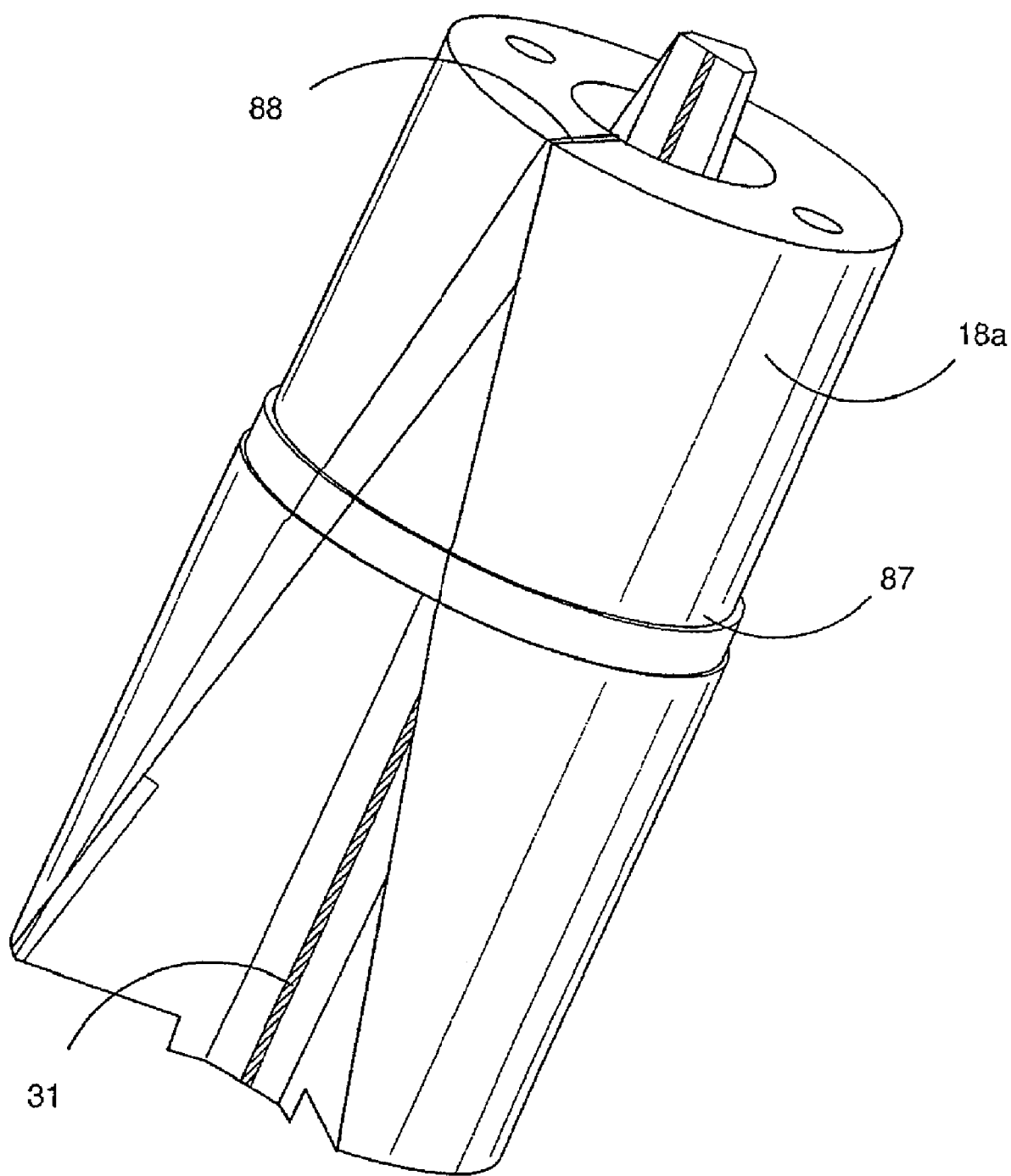
FIG. 11 is a perspective view of part of the mounting of FIG. 10 to illustrate the location and extent of the flexural web of the first mount.

As is shown in FIG. 11, the cut line 88 tapers outwardly from the upper end shown in FIG. 11 to the lower end and the core 18c tapers outwardly in corresponding shape.

Figure 12:
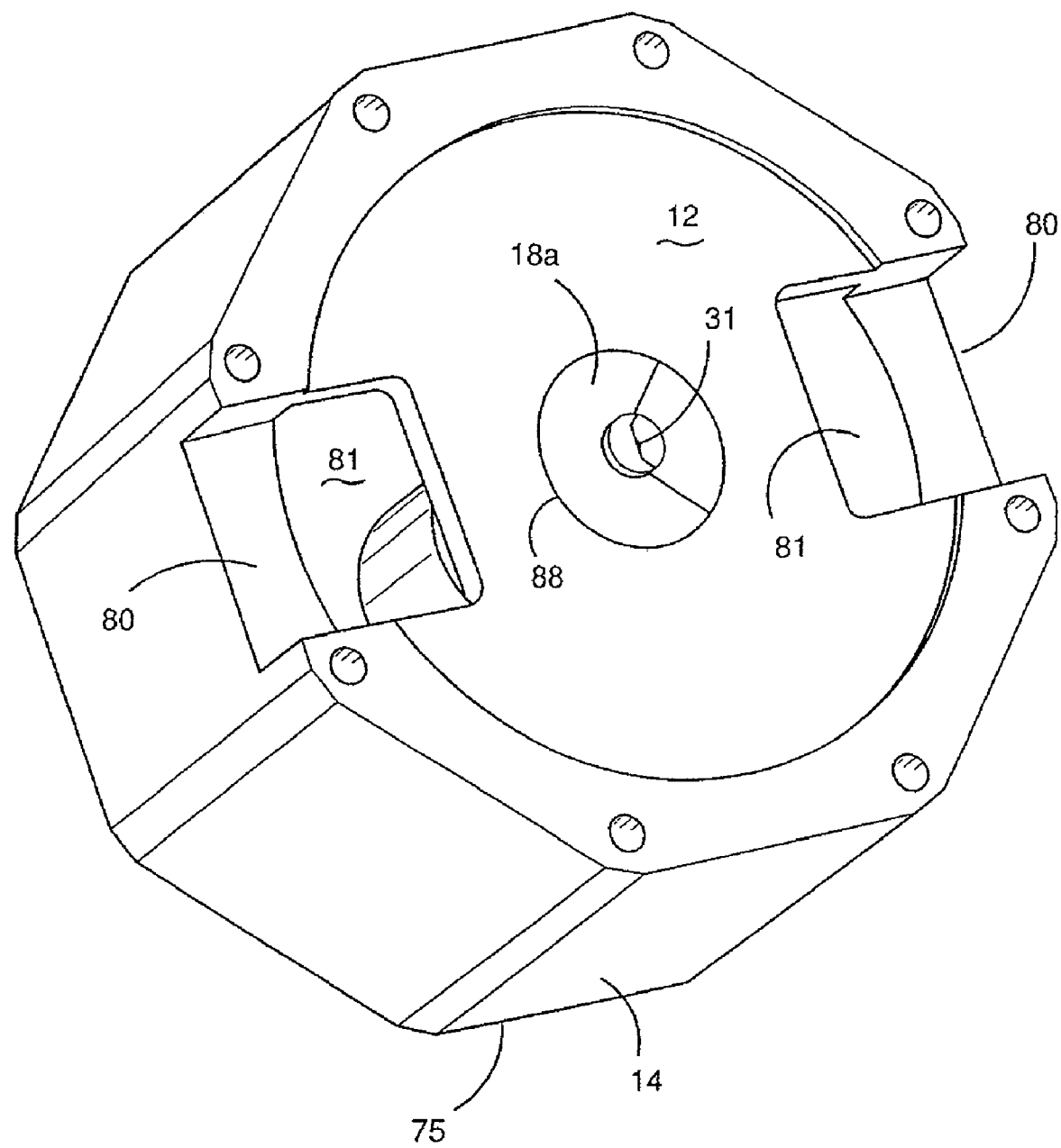
FIG. 12 is a perspective view of the mounting of FIG. 10 from beneath.
Figure 13:
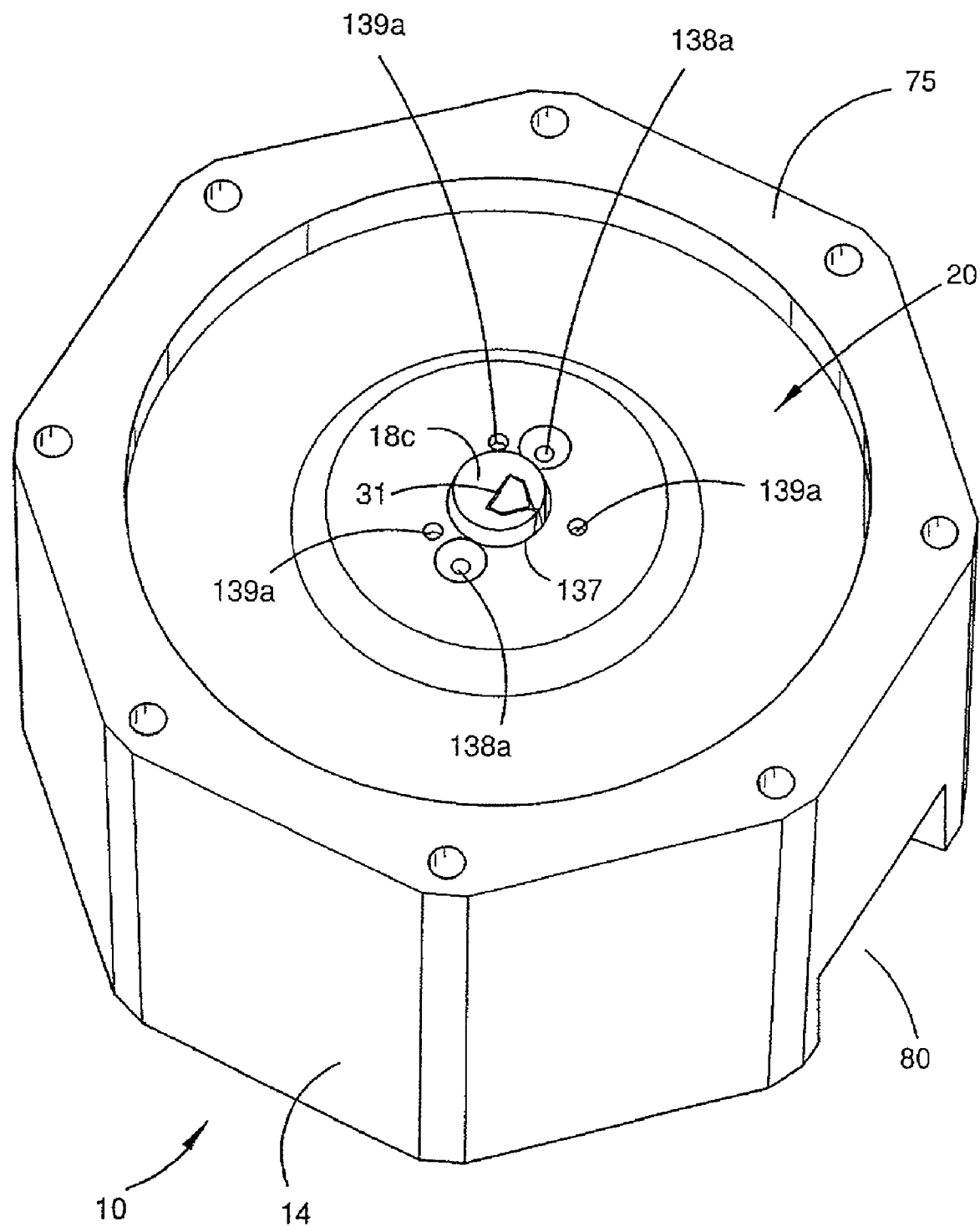
FIG. 13 is a perspective view of the mounting of FIG. 10 including a second mount of the second embodiment.

As is apparent from FIGS. 10, 12 and 13, the first mount 10 is octagonal in shape rather than round, as in the previous embodiment.

Figure 14:
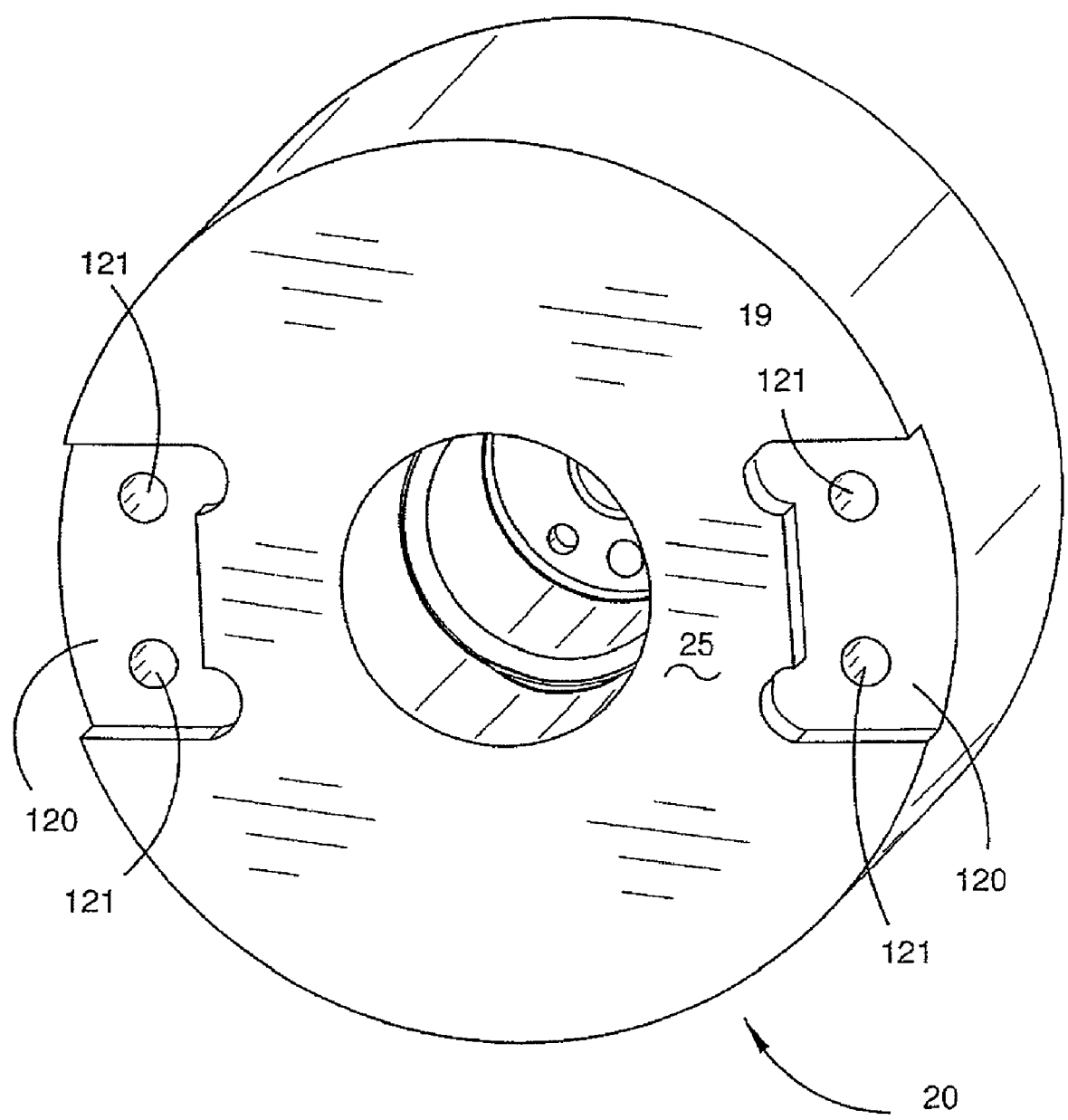
FIG. 14 is a perspective view of a second mount component.

FIG. 14 shows a component of the second mount 20 for mounting in the first mount 10. As is best shown in FIGS. 14 and 15, the second mount 20 has cut-outs 120 which register with the cut-outs 80 for receiving lugs (not shown). The lugs can bolt to the second mount 20 by bolts which pass through the lugs and into bolt holes 121. The lugs (not shown) are mounted to the mount 20 before the mount 20 is secured to the first mount 10.

In this embodiment, top wall 24 is provided with a central hole 137 and two attachment holes 138a. Three smaller holes 139a are provided to facilitate pushing of the first housing portion 45 off the part 18a if disassembly is required. When the second mount 20 is located within the first mount 10, the upper part of central section 18c projects through the hole 137, as best shown in FIG. 13. The mount 20 can then be connected to the mount 10 by fasteners which pass through the holes 138 and engage in holes 139b (see FIG. 10) in the part 18a.

Thus, when the first housing portion 45 and its associated bar 41 is connected to the rim 75 of the first mount 10 and the second housing portion 47 is connected to the base 12, flexure web 31 allows movement of the housing portions 45 and 47 about the z-axis.

Thus, when the second mount 20 is fixed to the part 18a, the second mount 20 can pivot with the first portion 10a of the first mount 10 about a z-axis defined by the flexure web 31 whilst the second portion formed by the part 18a remains stationary.

FIG. 16 shows main body 61 of the housing 1 and connectors 69 with the hemispherical ends removed.

Figure 17:
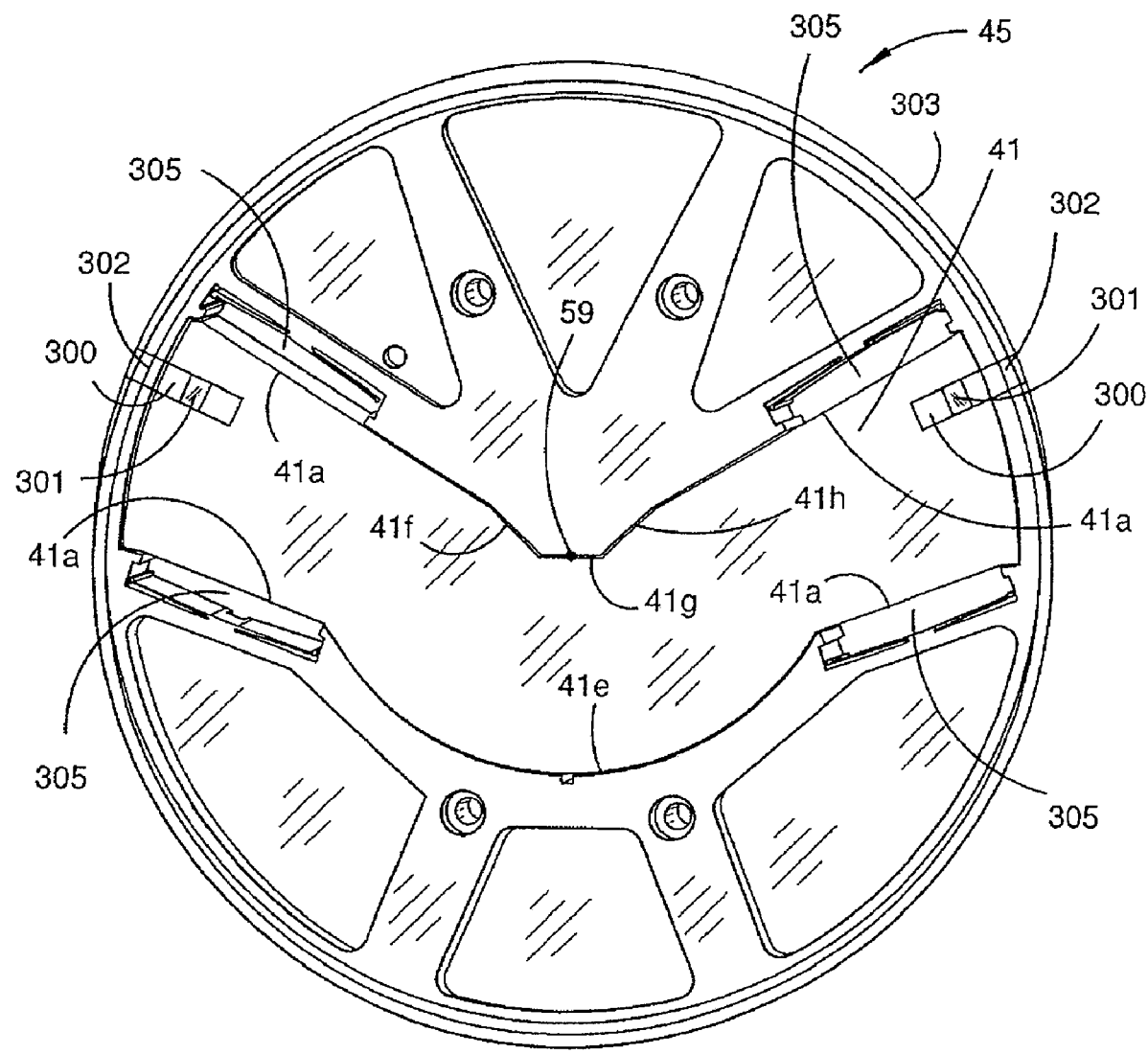
FIG. 17 is a plan view of a housing portion for supporting a bar according to a further embodiment of the invention.

FIG. 17 is a plan view of the first housing portion 45 according to a still further embodiment of the invention. As is apparent from FIG. 17, the first housing portion 45 is circular rather than octagonal, as is the case with the embodiment of FIG. 6.

The first housing portion 45 supports bar 41 in the same manner as described via flexure web 59 which is located at the centre of mass of the bar 41. The bar 41 is of chevron shape, although the chevron shape is slightly different to that in the earlier embodiments and has a more rounded edge 41e opposite flexure web 59 and a trough-shaped wall section 41f, 41g and 41h adjacent the flexure web 59. The ends of the bar 41 have screw-threaded bores 300 which receive screw-threaded members 301 which may be in the form of plugs such as grub screws or the like. The bores 300 register with holes 302 in the peripheral wall 52a of the first housing portion 45. The holes 302 enable access to the plugs 301 by a screwdriver or other tool so that the plugs 301 can be screwed into and out of the bore 300 to adjust their position in the bore to balance the mass 41 so the centre of gravity is at the flexure web 59.

As drawn in FIG. 17, the bores 300 are a 45° angle to the horizontal and vertical. Thus, the two bores (302 shown in FIG. 17) are at right angles with respect to one another.

FIG. 17 also shows openings 305 for receiving a portion of the transducers 71 for monitoring the movement of the bar 41 and producing signals in response to the movement.

Typically, each transducer 71 is in the form of a constant charge capacitor. One capacitor plate typically is mounted to the bar 41 and another capacitor plate is stationary relative to the bar 41 so that a gap is defined between the capacitor plates. Movement of the bar changes the gap which in turn changes a voltage across the constant charge capacitor.

Figure 18:
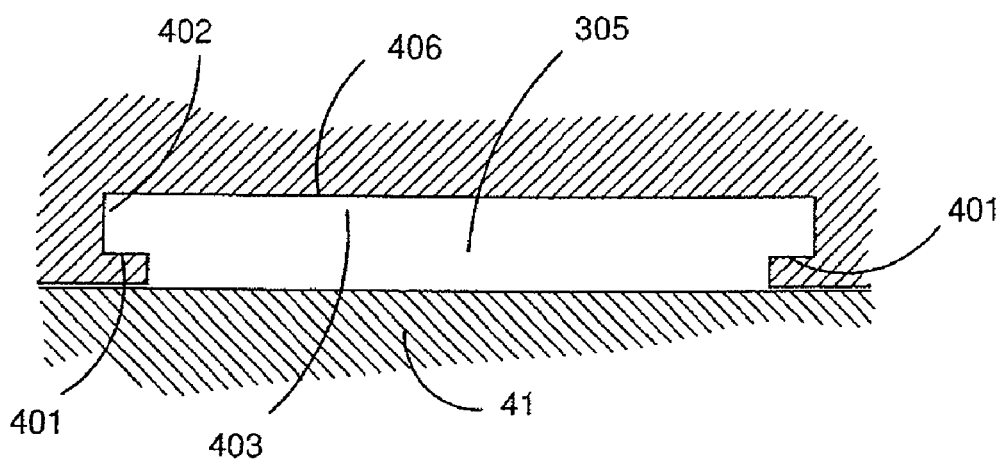
FIG. 18 shows a component of the gravity gradiometer according to an embodiment of the present invention.

FIG. 18 is a more detailed view of part of the housing portion of FIG. 17 showing the openings 305. As can be seen from FIG. 18, the openings 305 have shoulders 401 which form grooves 402.

FIG. 19(a) to (f) show portions of the constant charge capacitor transducers 71. The transducer shown in FIG. 19(a) comprises two electrodes. A first electrode is in this embodiment provided by a surface of the sensor bars 41 or 42, which are at ground potential, and a second electrode is shown in FIG. 19(a) (plate 408a).

FIG. 19(b) shows the second capacitor electrode which comprises two separate capacitor elements 408b and 407b which are not in electrical contact. Again, the first electrode is provided by the sensor bars 41 or 42, which are at ground potential. The capacitor element 408b surrounds the capacitor element 407b. This arrangement is used for generating a "virtual capacitor", which will be described below with reference to FIG. 22.

FIGS. 19(c) and (d) show alternatives to the embodiment shown in FIG. 19(b) and the shown second electrodes comprise adjacent elements 408c, 407c and 408d and 407d respectively.

FIGS. 19(e) and (f) show capacitor elements according to further embodiments of the present invention. The second electrode comprises three capacitor elements 408e, 407e, 407*f* and 408*f,* 407*g* and 407*h,* respectively, and this arrangement is also used for generating a "virtual capacitor which will be described below.

It will be appreciated, that in variation of this embodiment the capacitor plates may have any other suitable cross-sectional shape.

Figure 20:
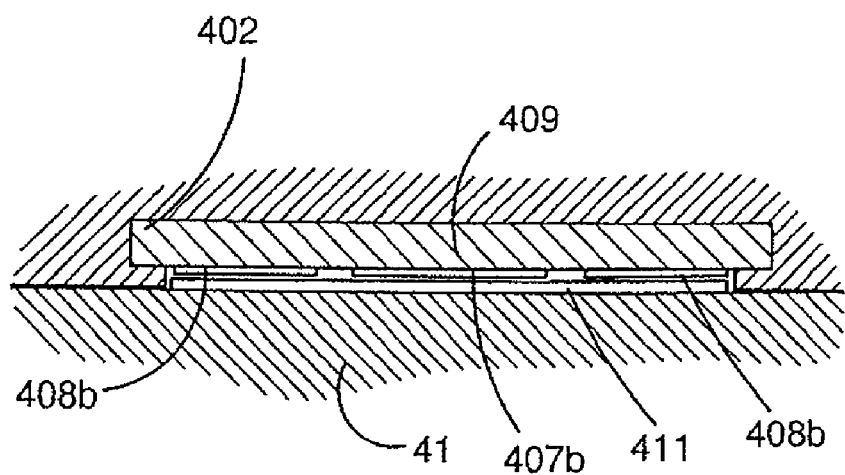
FIG. 20 is a view similar to FIG. 18 but showing one of the transducers elements of FIG. 19 in place.

As an example, FIG. 20 shows the location of the capacitor elements 407*b* and 408*b* in the opening 305 and opposite a corresponding second capacitor plate 411. In this embodiment the capacitor elements 407*b* and 408*b* are provided in the form of metallic foils that are positioned on insulating body 409. The plate 411 is metallic and positioned on the bar 41. In this embodiment plate 411 provides one capacitor element that opposes capacitor elements 407*b* and 408*b*. In this case the bar 41 may be of relatively low electrical conductivity or may be electrically insulating.

If bar 41 is provided in the form of a metallic material of sufficiently high electrical conductivity, the bar 41 itself may also provide a capacitor element and a portion of the bar 41 may directly oppose the capacitor elements 407*b* and 408*b* without the plate 411, as discussed above in the context of FIG. 17.

Figure 21:
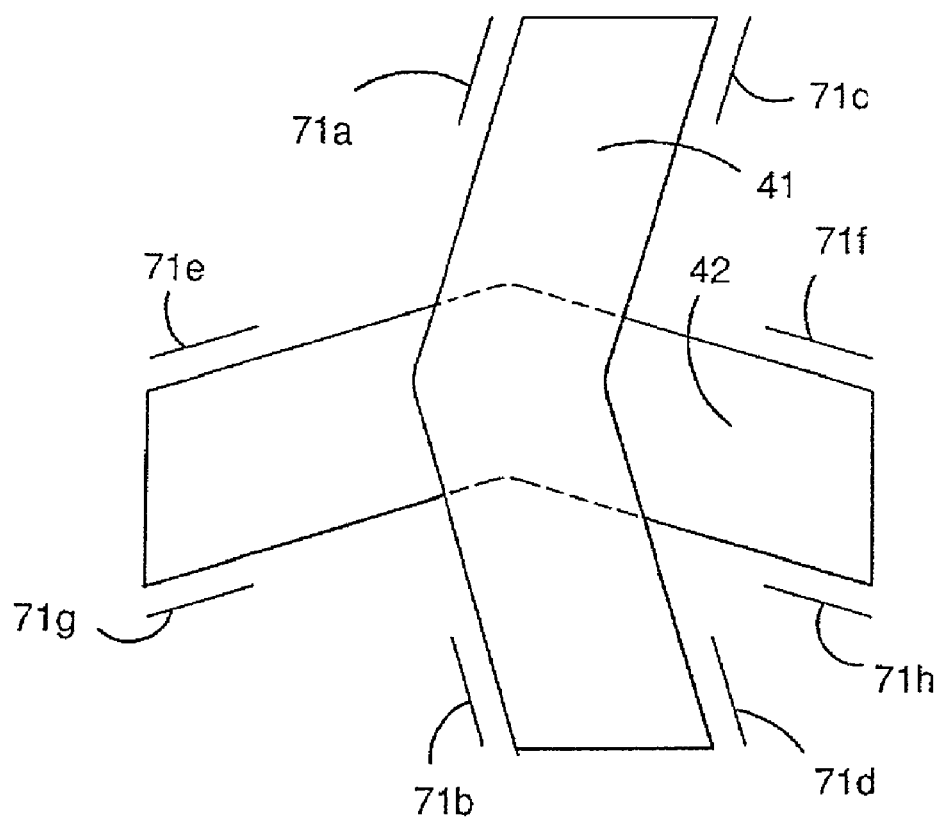
FIG. 21 is a diagram to assist explanation of the circuits of FIG. 22.

FIG. 21 is a diagram of the bars 41 and 42 showing them in their "in use" configuration. The transducers which are located in the openings 305 are shown by reference numbers 71*a* to 71*e*.

As will be apparent from FIG. 21, four transducers 71 are arranged adjacent the ends of the bar 41. The second housing portion 47 also has four transducers arranged adjacent the bar 42. Thus, eight transducers 71 are provided in the gradiometer.

Figure 22:
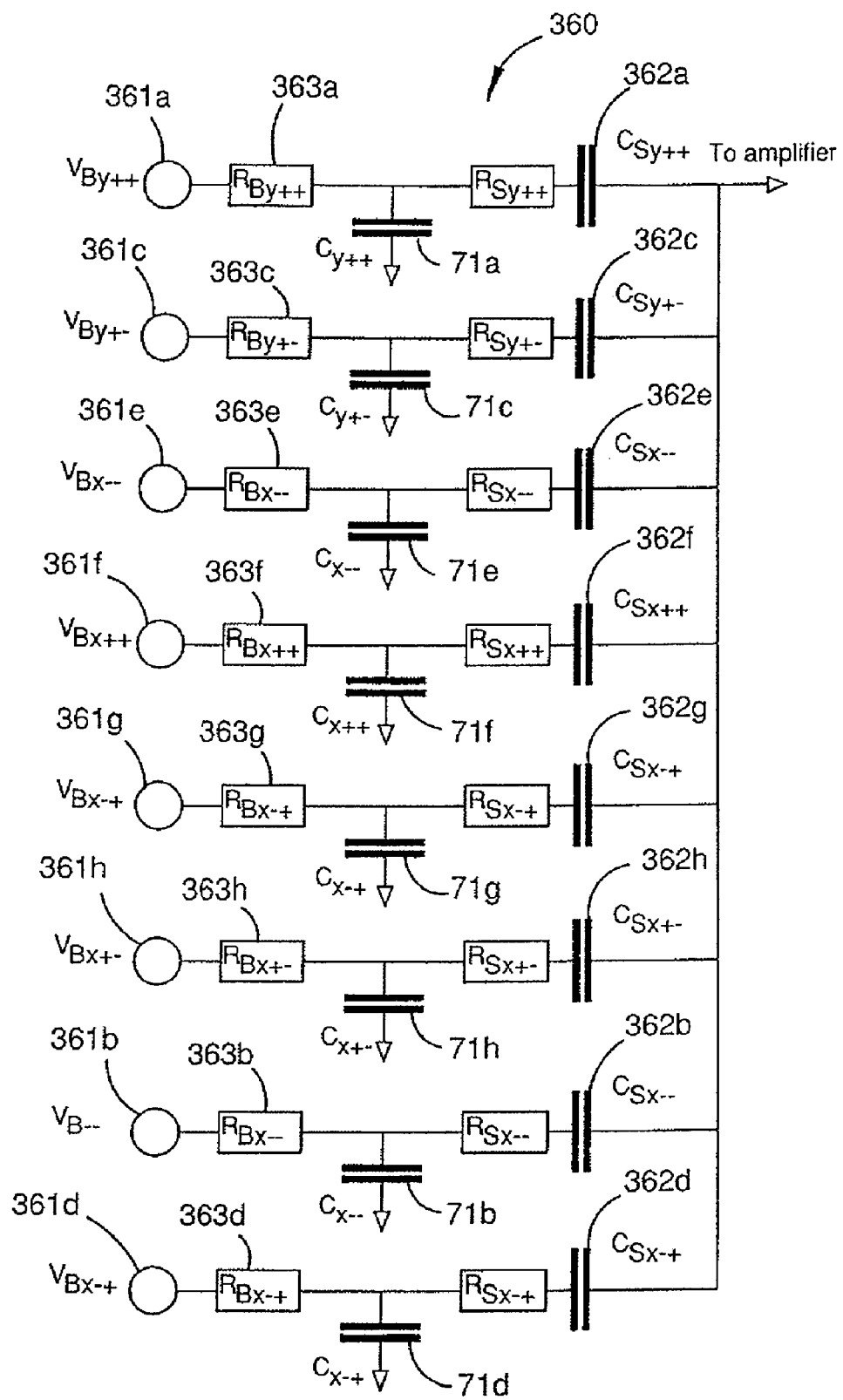
FIG. 22 is a circuit diagram relating to a specific embodiment of the invention.
Figure 23:
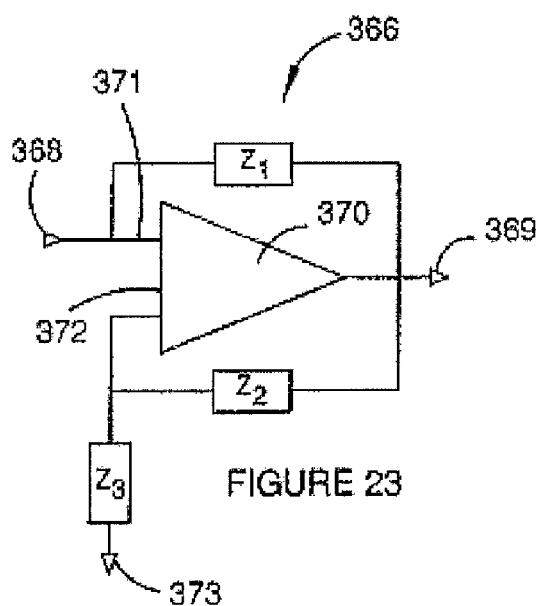
FIG. 23 is a frequency tuning circuit according to an embodiment of the present invention.

Referring now to FIGS. 22 and 23 transducer circuitry 360 is now described. Each of the transducers 71*a* to 71*e* is a constant charge capacitor and comprises a first capacitor electrode. Each of the transducers 71*a* to 71*e* has a second capacitor electrode that is positioned opposite a respective first capacitor electrode and fixed in position relative to the housing portions. The first capacitor electrode is in this embodiment provided by a surface the sensor bars 41 or 42. For example, each transducer 71*a*-71*e* may have a second electrode of the type as shown in FIG. 19.

Oscillating movement of the sensor masses 41 and 42 results in a movement of the first capacitor electrodes (surfaces of the sensor bars 41 or 42) relative to the second capacitor electrodes. That movement changes the gaps between respective first and second capacitor electrodes and results in a voltage change across the constant charge capacitor transducers 71*a* to 71*e*.

Figure 19:
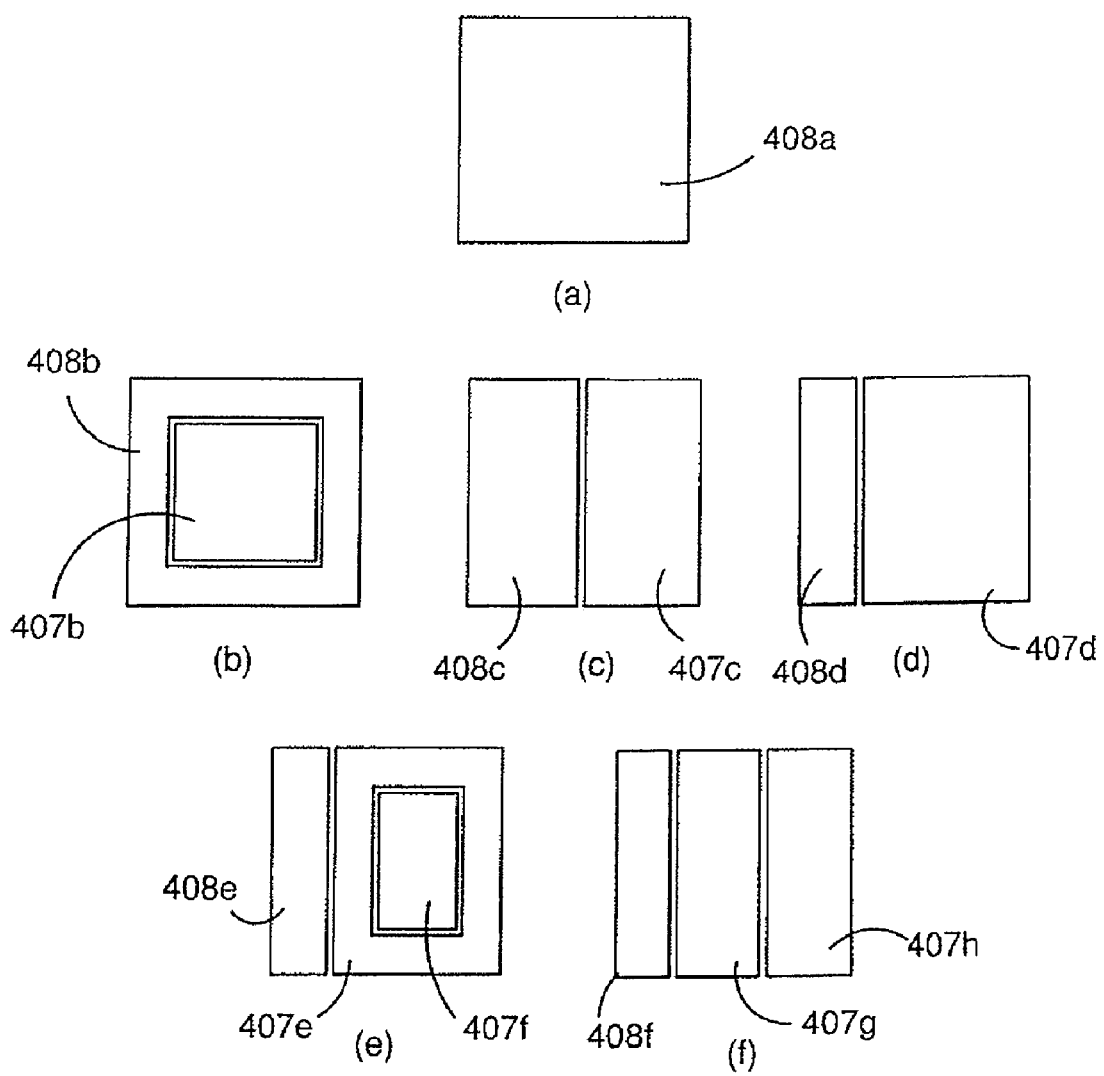
FIG. 19(a)-(f) is a view of transducer elements according to a specific embodiment of the present invention.

If the transducers are of the type as shown in FIG. 19(*b*) to 20(*d*), then separate component transducers are formed between the first electrode and each capacitor element of the second electrode, such as 407*b* and 408*b*. In this case FIG. 22 shows the transducer circuitry for the component transducers formed between the first plate and one of the two elements and an analogous circuitry (labeled accordingly) is used for the component transducers formed between the first electrode and the other capacitor elements.

If the transducers are of the type as shown in FIGS. 19(*e*) and 19(*f*), then separate component transducers are formed between the first electrode and each of the three capacitor elements, such as 408*e,* 408*e* and 407*f*. In this case. FIG. 22 shows the transducer circuitry for the component transducers formed between the first electrode and one of the three elements and two analogous circuitries (labeled accordingly) are used for the component transducers formed between the first plate and the other capacitor elements.

Each constant charge capacitor component transducer 71*a* to 71*e* has a separate bias voltage by a respective bias voltage source $V_{B\alpha\beta\gamma}$ applied to it. FIG. 22 shows component transducer 71*a* to 71*e* with one of the capacitor elements being connected to ground potential. As discussed above, these capacitor elements are surfaces of the sensor bars 41 and 42, which are in this embodiment electrically conductive and connected to ground potential. The polarities of the voltages provided by the bias voltage sources 361*a* to 361*e* and the electrical interconnections between the constant charge capacitor component transducers 71*a* to 71*e* are chosen so that the electrical signals generated by all transducers are combined with the same polarity if the sensor masses 41 and 42 oscillate in opposite directions. Such oscillation in opposite directions typically is generated by a gravity gradient. If the sensor masses 41 and 42 move in the same direction, one half of the electrical signals generated by the constant charge capacitors component transducers 71*a* to 71*e* has one polarity and the other half has an opposite polarity. Consequently, in this case, the electrical signals typically cancel each other. Such movement in the same direction may for example be generated by a sudden movement of the aircraft in which the gravity gradiometer is positioned and consequently the transducer circuitry 360 illustrated in FIG. 22 reduces the effect of such sudden movements and the effect of a number of other external forces or external angular accelerations that are not related to the gravity gradient.

The combined electrical signal is directed to a low noise amplifier which will be described in the context of FIG. 23.

The transducer circuitry 360 shown in FIG. 22 also comprises locking capacitors $C_{S\alpha\beta\gamma}$ which are arranged so that the applied bias voltages $V_{B\alpha\beta\gamma}$ cannot reach the lower noise amplifier. The locking capacitors 362*a* to 362*e* typically have a capacitance that is larger than 10 times, or even larger than 100 times that of the respective constant charge capacitor component transducers 71*a* to 71*e*.

Further, the transducer circuitry 360 comprises resistors $R_{B\alpha\beta\gamma}$ 363*a* to 363*e*. These resistors typically have a very high resistance, such as 1 GΩ or more, and are arranged for substantially preventing flow of charges and thereby providing for the component transducers 71*a* to 71*e* to operate as constant charge capacitors.

The bias voltages applied to the constant charge capacitors generate electrostatic forces. Consequently, each transducer 71*a* to 71*e* can also function as an actuator.

Figure 25:
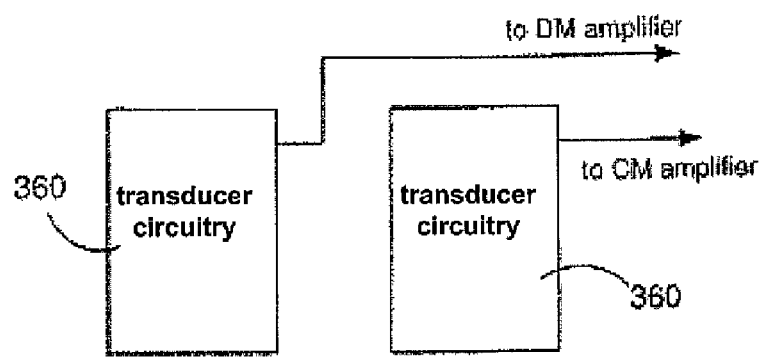
Figure 28:
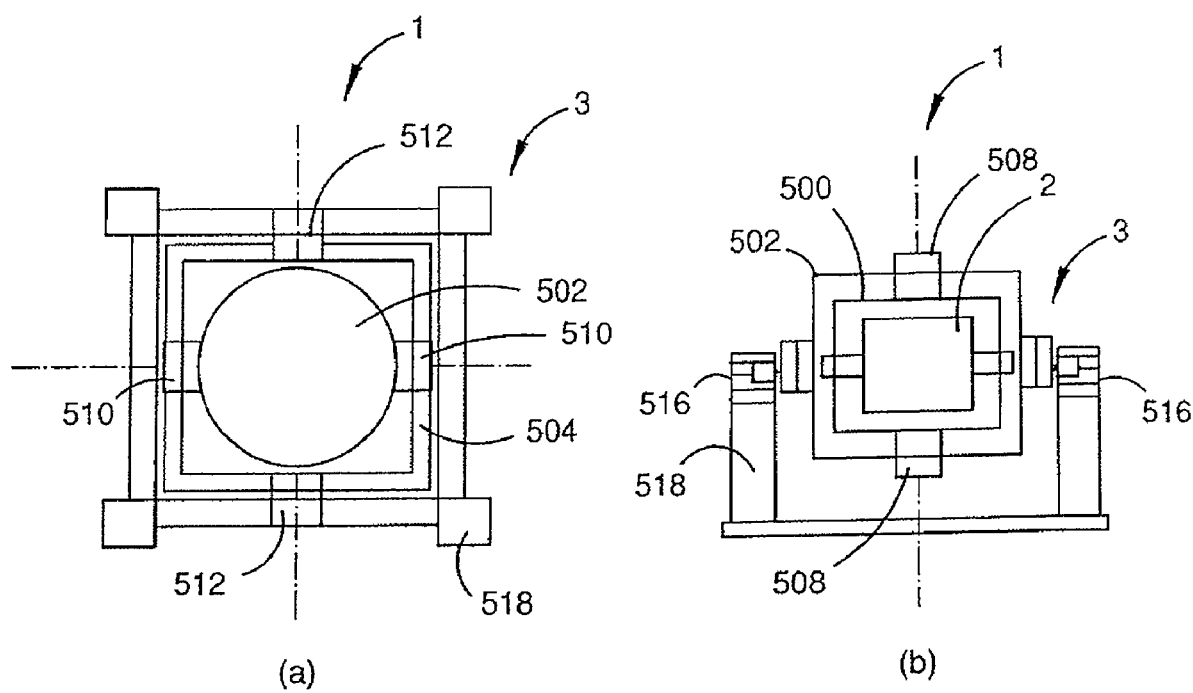
FIGS. 28(a) and (b) shows components of the gravity gradiometer according to a specific embodiment of the present invention.

If the transducers 71 are of the type as shown in FIG. 19(*a*), then the circuitry 360 shown in FIG. 22 is sufficient. However in a specific embodiment of the present invention the transducers are of the type as shown in FIGS. 19(*b*) to 19(*d*) and comprise two component transducers. In this case two circuitries 360 are used, one for the component transducers formed between the first electrodes and one of the capacitor elements, and the other for the component transducers formed between the first electrodes and the other capacitor elements. This is schematically indicated in FIG. 25. A first circuitry 360 is used for measurement purposes (differential mode, "DM") and a second circuitry 360 is used to provide feedback for external rotational motion correction (common mode, "CM"), which will be described below with reference to FIGS. 28 and 29.

Figure 24:
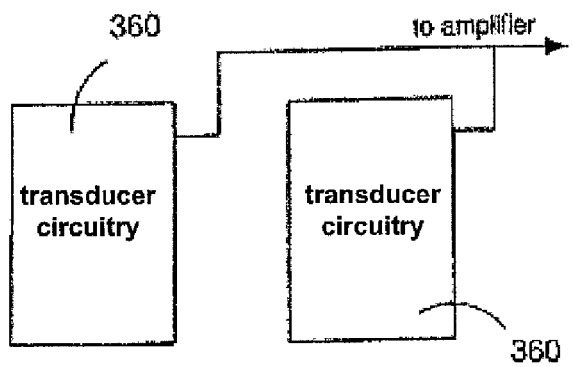
FIGS. 24 to 26 show circuitry according to embodiments of the present invention.

Alternatively, the circuitries 360 may also be connected so that "virtual capacitors" are formed. This will be described below in more detail and is schematically indicated in FIG. 24.

Figure 26:
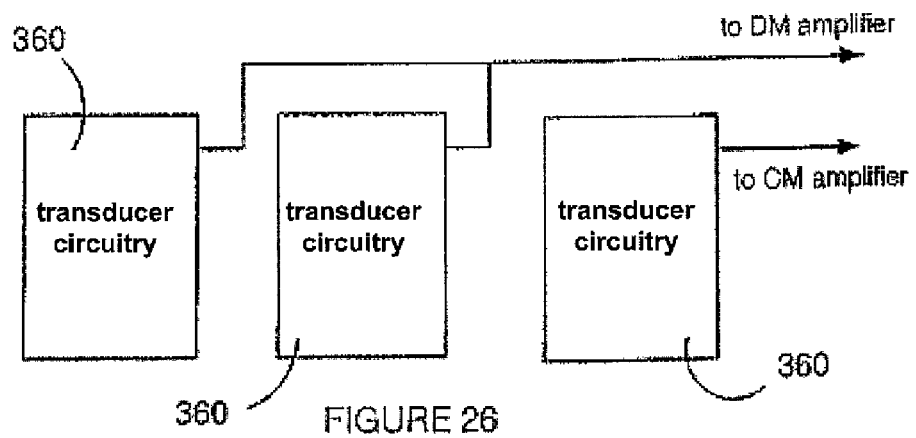

In another specific embodiment of the present invention the transducers are of the type as shown in FIG. 19(*e*) or 19(*f*) and comprise three component transducers. In this case three circuitries 360 are used. This is schematically indicated in FIG. 26. In this embodiment two circuitries 360 are used for measurement purposes and arranged so that "virtual capacitors" are formed. A third circuitry 360 is used to provide feedback for external rotational motion correction.

The following will describe how relative mechanical properties of the sensor masses 41 and 42 can be tuned. The resonance frequencies of the sensor masses 41 and 42 depend on the square of the electrostatic forces and therefore the square of the applied bias voltage. For example, the resonance frequencies may be tuned using a mechanical test set up in which external forces are applied to the sensor masses 41 and 42. If the resonance frequencies are not identical, the bias voltages can be adjusted until the resonance frequencies are identical.

The sensitivities of the transducer capacitors for sensing the movement of the sensor masses is linearly dependent on the electrostatic forces and thereby linearly dependent on the applied bias voltages. Consequently, it is possible to tune both the resonance frequencies and the sensitivities of the transducers FIG. 23 shows a schematic circuit diagram of a low noise amplifier according to a specific embodiment of the present invention. The low noise amplifier circuitry 366 is used to amplify the electrical signal generated by the transducer circuit 360 and to provide active feedback to control properties of the transducers and sensor masses 41 and 42.

The amplifier circuit 366 simulates an impedance $Z_L$ and an ohmic component of $Z_L$ provides active damping of resonant electrical signals generated by the constant charge capacitor component transducers 71a to 71e described above. The active damping reduces the Q-factor of the resonance and thereby increases the bandwidth within which the resonance can be generated. That electrical damping results in mechanical damping by generating electrostatic damping forces at the constant charge capacitor component transducers 71a-71e. Typically, the active damping is adjusted so that the gravity gradiometer has a bandwidth of the order of 1 Hz and the Q-factor of the active damping is close to 0.5.

The impedance $Z_L$ also has an imaginary component, which is dependent on a simulated capacitance $C_L$ in parallel with the simulated resistor $R_L$. The imaginary component actively controls the resonance frequency of the sensor masses 41 and 42 via the constant charge capacitor transducers 71a-71e by simulating a change of the "stiffness" of the pivotal coupling of the sensor masses 41 and 42 and thereby fine-tunes the resonance frequency of the sensor masses 41 and 42. As described above, the transducer circuit 360 is arranged so that resonant oscillations in which the sensor masses 41 and 42 oscillate in opposite directions result in an additive electrical signal. The simulated capacitance $C_L$ of the simulated impedance $Z_L$ allows fine tuning of the resonance and thereby further helps distinguishing that resonance oscillation from other common mode oscillations in which the sensor masses 41 and 42 oscillate in the same direction.

In this embodiment the amplifier circuit 366 provides "cold damping", which introduces very little thermal noise. Passive damping, such as damping using a conventional resistor, is avoided as this would result in thermal noise.

As described above, the constant charge component capacitors 71a-71e may combine sensing and actuator functions. The amplifier circuit 366 provides an active feedback loop between sensing and actuator functions and provides electronic feedback control of mechanical properties of the sensor masses 41 and 42.

The amplifier circuit 366 comprises an input 368 and an output 369. Further, the amplifier circuit 366 comprises a low-noise j-FET differential amplifier 370 and impedances Z1, Z2 and Z3. The low noise amplifier 370 has two input terminals 371 and 372 and the impedance $Z_1$ is connected between the output terminal 369 and the low noise amplifier input 371. The impedance $Z_2$ is connected between the output terminal 369 and the low noise amplifier input 372. The impedance $Z_3$ is connected between the terminal 372 and a common ground terminal 373.

The amplifier circuit 366 simulates the impedance $Z_L$ with $$Z_L \approx -\frac{Z_1 Z_3}{Z_2}. \qquad (\text{eq. 1})$$

The amplifier 370 has noise matched resistance $$R_{opt} = \sqrt{\frac{S_V}{S_i}}.$$

The term $S_v$ is the spectral density of amplifier's voltage noise and the term $S_i$ is the spectral density of amplifier's current noise. In this embodiment the amplifiers noise matched resistance is a few 1 MΩ.

Further, the amplifier 370 has a noise temperature $$T_{opt} = \frac{\sqrt{S_V S_i}}{2k_B}$$

($k_B$: Bolzman constant) of less than 1K.

The noise density $S_\Gamma$ of the gradient error produced by thermal noise near resonance is given by $$S_\Gamma = \frac{4 k_B T_{opt} 2\pi f_0}{m \lambda^2 Q_{act}} \qquad (\text{eg. 2})$$

where $\lambda$ is the radius of the gyration of the sensor masses 41 and 42 and $Q_{act}$ the effective Q-factor associated with the active damping, M is the mass of the senor masses 41 and 42 and $f_o$ is the resonance frequency. The noise density $S_\Gamma$ is dependent on the noise of the amplifier and not on the physical temperature of the amplifier circuit, which allows "cold damping" and control of other mechanical properties without introducing significant thermal noise at normal operation temperatures such as at room temperature.

The component transducers 71a, 71b, 71g and 71h are also used to form angular accelerometers for measuring the angular movement of the mounting 5 so that feedback signals can be provided to compensate for that angular movement.

Figure 27:
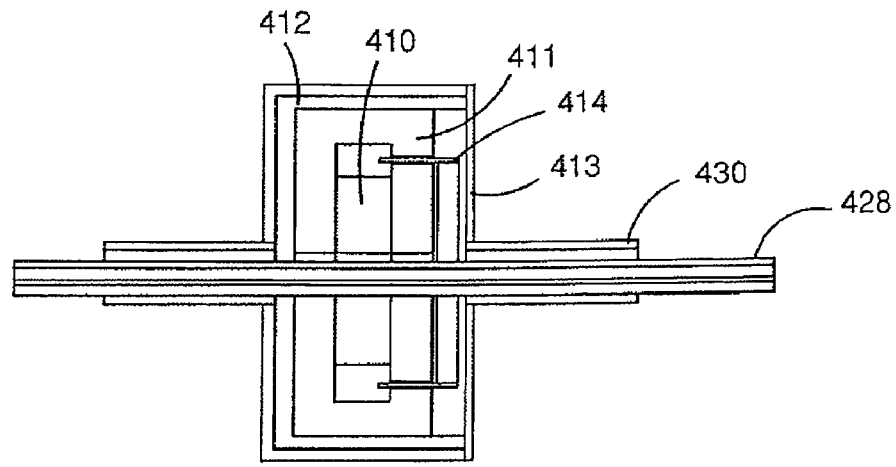
FIG. 27 is a cross-sectional perspective view through an actuator according to a specific embodiment of the invention.

FIG. 27 shows an actuator for receiving the control signals to adjust the mounting in response to angular movement of the mounting 5.

The actuator shown in FIG. 27 is also schematically shown in FIG. 8 by reference to numerals 53 and 54. The actuators are the same and FIG. 28 will be described with reference to the actuator 54.

The actuator 54 comprises in this embodiment a permanent NdFeB magnet 410, a soft iron core 411, a non-magnetic spacer 412 (aluminium, delrin), mumetal or permalloy housing 413, a voice coil assembly 414, a hollow rod 428 and a tube 430 that forms part of the housing 413 and in which the hollow rod 428 is rotatably mounted.

The voice coil assembly 414 is mounted onto rod 430 and the permanent magnet 410 and the soft iron core 411 are provided with internal bores through which the rod 430 penetrates so that the rod 430 with voice coil assembly 414 can move axially relative to the iron core 311 and the magnet 410. Electrical connections for the voice coil assembly 414 are fed through the hollow rod 430.

As described above, one or both of the bars 41 and 42 can also be used as an angular accelerometer to provide a measure of angular movement of the mounting 5 so that appropriate feedback signals can be generated to compensation for that movement by control of the actuators previously described.

FIGS. 28(a) and (b) show schematic plan and cross-sectional view of the gravity gradiometer 1. As indicated previously, the gravity gradiometer 1 comprises a housing 2 that is rotated by an external mounting about a z-axis. The external mounting comprises an inner stage 500 and an intermediate stage 502 and an outer stage 504. The housing 2 is mounted so that it is rotated with the inner stage 500 by z-drive 508 with bearings. The z-drive provides continuous rotation at a very stable speed. The rotational frequency is in this embodiment selectable between 0 and 20 Hz. The intermediate stage 502 including the inner stage 500 is rotable about the x-axis by x-drive 510, which includes bearings and the outer stage 504 is rotable with the intermediate stage 502 about the y-axis by y-axis drive 512 which also include suitable bearings. The outer stage with y-axis drive is mounted on springs 516 in a support frame 518.

The external mount 3 includes an IMU (inertial measurement unit), which contains gyroscopes, accelerometers, GPS receivers and a computer. The IMU is not shown in FIG. 28(a) or (b). The IMU measures rotation about the x-, y- and z-axis and is coupled to drives in a feedback loop. This will be described below in more detail with reference to FIG. 29.

The external mounting is arranged to gyro-stabilize the housing 2 about the x-, y- and z-axis with a gain factor of approximately 100 DC and a bandwidth of 20 Hz. This is achieved using the above-described 3-axis "gimbal" bearing arrangement with direct drive torque motors (508, 510 and 512). In this embodiment, fine-tuning of the motor drive for correction of rotation about the z-axis is achieved using the "common mode" signal provided by respective transducer components positioned within the housing 2.

Figure 29:
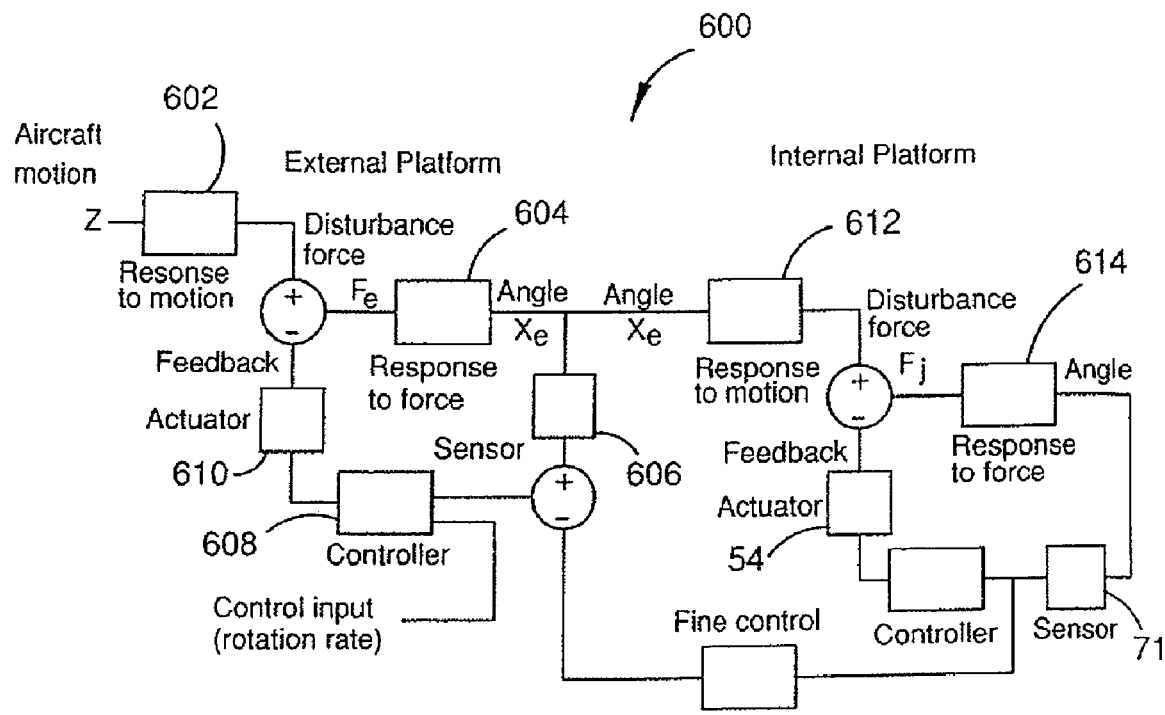
FIGS. 29 and 30 show block diagrams illustrating the operation of a rotatable support system according to a specific embodiment of the present invention.

FIG. 29 shows a block diagram 600 that illustrates how the common mode signal, generated within the housing 2 ("internal platform"), is used for rotational z-axis correction of the external support structure ("external platform").

Blocks 602 and 604, labelled "response to motion" and "response to force" respectively, both represent the gimbal structure of the support structure 3. Each gimbal consists of three main components, namely a frame, a part supported by the frame via a bearing and an actuator which applies a torque (force) to this part. Each gimbal has two independent inputs, namely motion applied to the frame and a force applied directly to the part suspended by the frame. It has only one output, namely the angular position of the supported part and this responds differently to the two inputs.

Feedback force $F_e$ counteracts an external disturbance Z. This may be expressed by the following equation $$X_e = H_f F_e + H_z Z \quad \text{(eq. 3)}$$

where $H_f$ and $H_z$ are constants.

Equation 3 may be written as $$X_e = H_f(F_e + K_e Z) \quad \text{(eq. 4)}$$

where $K_e = H_z/H_f$.

An external motion, such as a motion of an aircraft in which the gravity gradiometer 1 is positioned, produces an equivalent force $K_e Z$, which is counteracted by $F_e$ generated by the actuator 610. In FIG. 29 block 602 "Response to motion" represents $K_e$ and block 604 "Response to force" represents $H_e$. The sensor 606 for the external platform is the IMU, which contains gyroscopes, accelerometers, GPS receivers and a computer. This provides a signal (usually digital) which measures the angular position and angular rate of the supported part of the innermost gimbal. This signal is used in the controller 608 (also usually digital) to implement the feedback.

The internal platform may be represented in an analogous manner where blocks 612 and 614 labelled "response to motion" and "response to force" respectively, both represent the z-axis gimbal structure within the housing 2. The transducer sensors 71 and the actuator 54 have been described above.

In the above-described embodiment the gravity gradiometer 1 is arranged so that rotation about the z-axis is controlled to a fixed uniform rotation speed. The input signal for controlling the motion is provided by the IMU 606 and directed to the controller 608. However, the IMU 606 may only have limited accuracy at the higher frequencies and to improve the z-axis rotational correction further, an angular acceleration derived from the above-described "Common Mode" signal from the internal transducers 71 is used for fine-tuning. This same signal is also used inside the internal platform in a feedback loop to stabilise the instrument against applied angular acceleration (via actuator 54). The specification for this internal feedback system is stringent and to ease this requirement, some of the burden is transferred to the external platform in that manner.

In a variation of the above-described embodiment the IMU may also be used in a feed-forward configuration.

Figure 30:
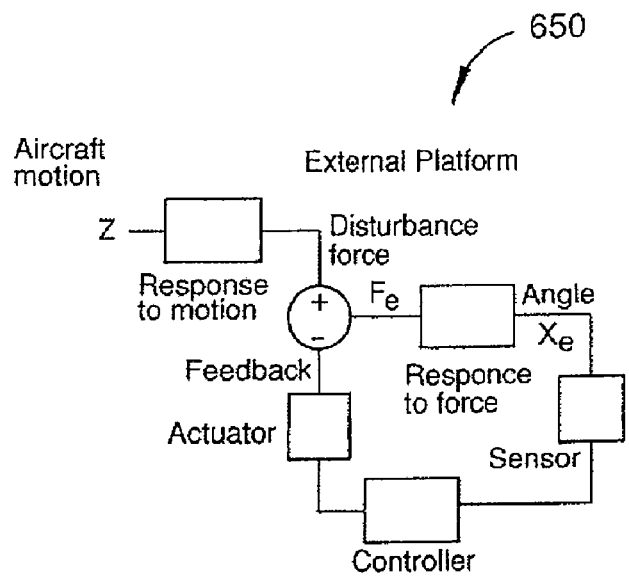

FIG. 30 shows a block diagram 650 that illustrates stabilisation (no rotation) about the x-and y-axis, which is performed exclusively by the external platform. All elements of FIG. 30 were already described above and function in an analogous manner to inhibit rotation about the x- and y-axes.

Although the invention has been described with reference to particular examples, it will be appreciated by those skilled in the art that the invention may be embodied in many other forms. For example, the transducers may not necessarily be provided in the form of constant charge capacitors, but may be provided in the form of any other suitable type of capacitor including those that do not allow simulation of a virtual capacitor. Further, it is to be appreciated that the amplifier circuitry 366 shown in FIG. 24 is only one embodiment and a variety of variations from the described embodiment are possible.

In addition, the gravity gradiometer may be arranged for measuring other components of the gravity gradient, in which case the gravity gradiometer would not be arranged for operation in the described orientation. For example, the gravity gradiometer may be arranged to measure the $\Gamma_{yz}$ and $(\Gamma_{zz}-\Gamma_{yy})$ or $\Gamma_{xz}$ and $(\Gamma_{zz}-\Gamma_{yy})$ of the gravity gradient.

The reference that is being made to documents WO 90/07131 and PCT/AU2006/001269 does not constitute an admission that these documents form a part of the common general knowledge in Australia or in any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A gravity gradiometer for measuring components of the gravity gradient tensor, the gravity gradiometer comprising:
   at least one sensor mass for movement in response to a gravity gradient;
   a pivotal coupling enabling the movement of the at least one sensor mass about an axis;
   a sensor and actuator unit for generating an electrical signal in response to the movement of the at least one sensor mass and for influencing the movement of the at least one sensor mass; and
   an electronic circuit for simulating an impedance, the electronic circuit being arranged for amplifying the electrical signal received from the sensor and actuator unit and for tuning the resonance frequency of the at least one sensor mass, the electronic circuit comprising:
      a differential amplifier having first and second amplifier input terminals and an amplifier output terminal;
      a reference terminal; and
      impedances Z1, Z2, Z3, at least one of the impedances having an imaginary impedance component;
      wherein the first and second amplifier input terminals and the amplifier output terminal are coupled via the impedances Z1 and Z2 respectively and the second amplifier input terminal is coupled to the reference terminal via the impedance Z3 whereby in use the impedance of approximately $$-\frac{Z_1 Z_3}{Z_2}$$

is simulated between the first amplifier input terminal and the amplifier output terminal.

2. The gravity gradiometer of claim 1, wherein the simulated impedance has a real and an imaginary component.

3. The gravity gradiometer of claim 2, wherein each impedance Z1, Z2 and Z3 comprises a resistor that is parallel coupled to at least one capacitor.

4. The gravity gradiometer of claim 1 wherein the sensor and actuator unit comprises a plurality of separate sensors and actuators.

5. The gravity gradiometer of claim 1 wherein the sensor and actuator unit comprises a plurality of transducers which each function as sensor and actuator.

6. The gravity gradiometer of claim 1 wherein the sensor and actuator unit is arranged for generating an ac electrical signal in response to an oscillation of the at least one sensor mass and wherein the electronic circuit is arranged so that the imaginary component of the simulated impedance influences the resonance frequency of the at least one sensor mass via the actuator of the sensor and actuator unit.

7. The gravity gradiometer of claim 6 wherein the electronic circuit is arranged for simulating the impedance ZL having a real and therefore ohmic component.

8. The gravity gradiometer of claim 7 wherein the electronic circuit is arranged so that the real component of the simulated impedance damps a resonant oscillation of the at least one sensor mass via the actuator of the sensor and actuator unit.

9. The gravity gradiometer of claim 1 wherein the differential amplifier has noise temperature $$T_{opt} = \frac{\sqrt{S_V S_i}}{2k_B}$$

of less than 5K, wherein $T_{opt}$ represents a noise temperature of the differential amplifier, $S_V$ represents a spectral density of a voltage noise of the differential amplifier, $S_i$ represents spectral density of a current noise of the differential amplifier, and $k_B$ represents the Bolzman constant.

10. The gravity gradiometer of claim 1 wherein the differential amplifier has noise temperature $$T_{opt} = \frac{\sqrt{S_V S_i}}{2k_B}$$

of less than 1K, wherein $T_{opt}$ represents a noise temperature of the differential amplifier, $S_V$ represents a spectral density of a voltage noise of the differential amplifier, $S_i$ represents spectral density of a current noise of the differential amplifier, and $k_B$ represents the Bolzman constant.

11. The gravity gradiometer of claim 1 arranged for operation at room temperature.

12. The gravity gradiometer of claim 11 wherein, in use, the sensor mass and an associated housing rotate continuously about a vertical axis of the gradiometer.

13. The gravity gradiometer of claim 1 wherein the sensor and actuator unit comprises one or more capacitor electrodes attached to a housing of the at least one sensor mass, said one or more capacitor electrodes located adjacent a surface of the at least one sensor mass such that the surface of the at least one sensor mass is a corresponding electrode to each of said one or more capacitor electrodes attached to said housing.

14. The gravity gradiometer of claim 13 wherein the sensor and actuator unit is configured for the one or more capacitor electrodes to operate as constant charge capacitors.

15. The gravity gradiometer of claim 14 wherein the electronic circuit damps the electrical signal of the sensor and actuator unit and thereby generates electrostatic forces at constant charge capacitors whereby oscillations of the at least one sensor mass are mechanically damped.

16. The gravity gradiometer of claim 15 wherein the damping produces a resonance frequency of the at least one sensor mass with a bandwidth of approximately 1 Hz and a Q factor of approximately 0.5.

17. The gravity gradiometer of claim 13 wherein an imaginary component of the simulated impedance influences the resonant frequency of the sensor mass.

18. A gravity gradiometer for measuring components of the gravity gradient tensor, the gravity gradiometer comprising:
   at least one sensor mass for movement in response to a gravity gradient;
   a pivotal coupling enabling the movement of the at least one sensor mass about an axis;
   a sensor and actuator unit for generating an electrical signal in response to the movement of the at least one sensor mass and for influencing the movement of the at least one sensor mass; and
   an electronic circuit for damping the electrical signal of the sensor and actuator unit, the electronic circuit comprising:
      a differential amplifier having first and second amplifier input terminals and an amplifier output terminal;
      a reference terminal; and
      impedances Z1, Z2, and Z3, at least one of the impedances having an imaginary impedance component,
      wherein the first and second amplifier input terminals and the amplifier output terminal are coupled via the impedances Z1 and Z2, respectively, and the second amplifier input terminal is coupled to the reference terminal via the impedance Z3, whereby the electrical signal of the sensor and actuator unit is in use damped by an impedance between the first input terminal and output terminal.

19. The gravity gradiometer of claim 18 wherein the sensor and actuator unit comprises one or more capacitor electrodes attached to a housing of the at least one sensor mass, said one or more capacitor electrodes located adjacent a surface of the at least one sensor mass such that the surface of the at least one sensor mass is a corresponding electrode to each of said one or more capacitor electrodes attached to said housing, said damping of said electrical signal effects mechanical damping of oscillations of said sensor mass about said pivotal coupling.

20. The gravity gradiometer of claim 19 wherein, in use, the sensor mass oscillates about said pivotal coupling in response to continuous rotation of said mass and an associated housing about an axis of the gradiometer, whereby the electrical signal of said sensor and actuator unit is an AC electrical signal.

21. The gravity gradiometer of claim 20 wherein the damping produces a resonance frequency of the at least one sensor mass with a bandwidth of approximately 1 Hz and a Q factor of approximately 0.5.

22. The gravity gradiometer of claim 18 wherein, in use, the sensor mass oscillates about said pivotal coupling in response to continuous rotation of said mass and associated housing about an axis of the gradiometer, whereby the electrical signal of said sensor and actuator unit is an AC electrical signal.

23. The gravity gradiometer of claim 22 wherein the damping produces a resonance frequency of the at least one sensor mass with a bandwidth of approximately 1 Hz and a Q factor of approximately 0.5.

* * * * *